(12) United States Patent
Takagishi et al.

(10) Patent No.: US 10,170,141 B1
(45) Date of Patent: Jan. 1, 2019

(54) MAGNETIC RECORDING AND REPRODUCING DEVICE

(71) Applicant: KABUSHIKI KAISHA TOSHIBA, Tokyo (JP)

(72) Inventors: Masayuki Takagishi, Tokyo (JP); Tomoyuki Maeda, Kanagawa (JP); Yousuke Isowaki, Kanagawa (JP); Naoyuki Narita, Kanagawa (JP); Katsuya Sugawara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/922,387

(22) Filed: Mar. 15, 2018

(30) Foreign Application Priority Data

Jul. 10, 2017 (JP) ................................ 2017-134480

(51) Int. Cl.
  *G11B 20/14* (2006.01)
  *G11B 5/09* (2006.01)
  (Continued)

(52) U.S. Cl.
  CPC .............. *G11B 5/596* (2013.01); *G11B 5/012* (2013.01); *G11B 5/09* (2013.01); *G11B 20/10027* (2013.01); *G11B 2005/001* (2013.01)

(58) Field of Classification Search
  CPC ..... G11B 20/1407; G11B 20/14; G11B 20/16; G11B 20/1419; G11B 20/12; G11B 5/00;
  (Continued)

(56) References Cited

U.S. PATENT DOCUMENTS 7,768,893 B2 * 8/2010 Gushima ............ G11B 7/00454
  369/275.3
7,830,631 B2 11/2010 Nakagawa et al.
  (Continued)

FOREIGN PATENT DOCUMENTS

| JP | 2008-41159 A | 2/2008 |
| JP | 2013-109815 A | 6/2013 |
| JP | 2016-85781 A | 5/2016 |

*Primary Examiner* — Nabil Hindi
(74) *Attorney, Agent, or Firm* — Finnegan, Henderson, Farabow, Garrett & Dunner, L.L.P.

(57) ABSTRACT

According to one embodiment, a magnetic recording and reproducing device includes an output driver, a magnetic head, and a magnetic recording medium. The output driver outputs a recording signal corresponding to input information. The magnetic head includes a coil. A recording current includes the recording signal flows in the coil. Information corresponding to the input information is recorded in the magnetic recording medium. The input information includes first, second, and third information combinations. The first information combination includes first to fourth information. The second information combination includes fifth to eighth information. The third information combination includes ninth to twelfth information. The recording signal changes to an eleventh recording current to correspond to the eleventh information. The recording signal changes to a third recording current to correspond to the third information. An absolute value of the eleventh recording current is greater than an absolute value of the third recording current.

18 Claims, 10 Drawing Sheets

(51) Int. Cl.
*G11B 5/596* (2006.01)
*G11B 5/012* (2006.01)
*G11B 20/10* (2006.01)
*G11B 5/00* (2006.01)

(58) Field of Classification Search
CPC ... G11B 20/10009; G11B 27/36; G11B 20/06; G11B 20/08; G11B 20/10268; G11B 5/012; G11B 2005/001; G11B 5/09
USPC ........ 369/116, 59.11, 59.12; 360/25, 29, 32, 360/40, 44, 48
See application file for complete search history.

(56) References Cited

U.S. PATENT DOCUMENTS

| | | |
|---|---|---|
| 8,929,013 B1 | 1/2015 | Mastrocola et al. |
| 9,111,561 B1 | 8/2015 | Contreras et al. |
| 2008/0043358 A1 | 2/2008 | Nakagawa et al. |
| 2013/0128375 A1 | 5/2013 | Livshitz et al. |

* cited by examiner

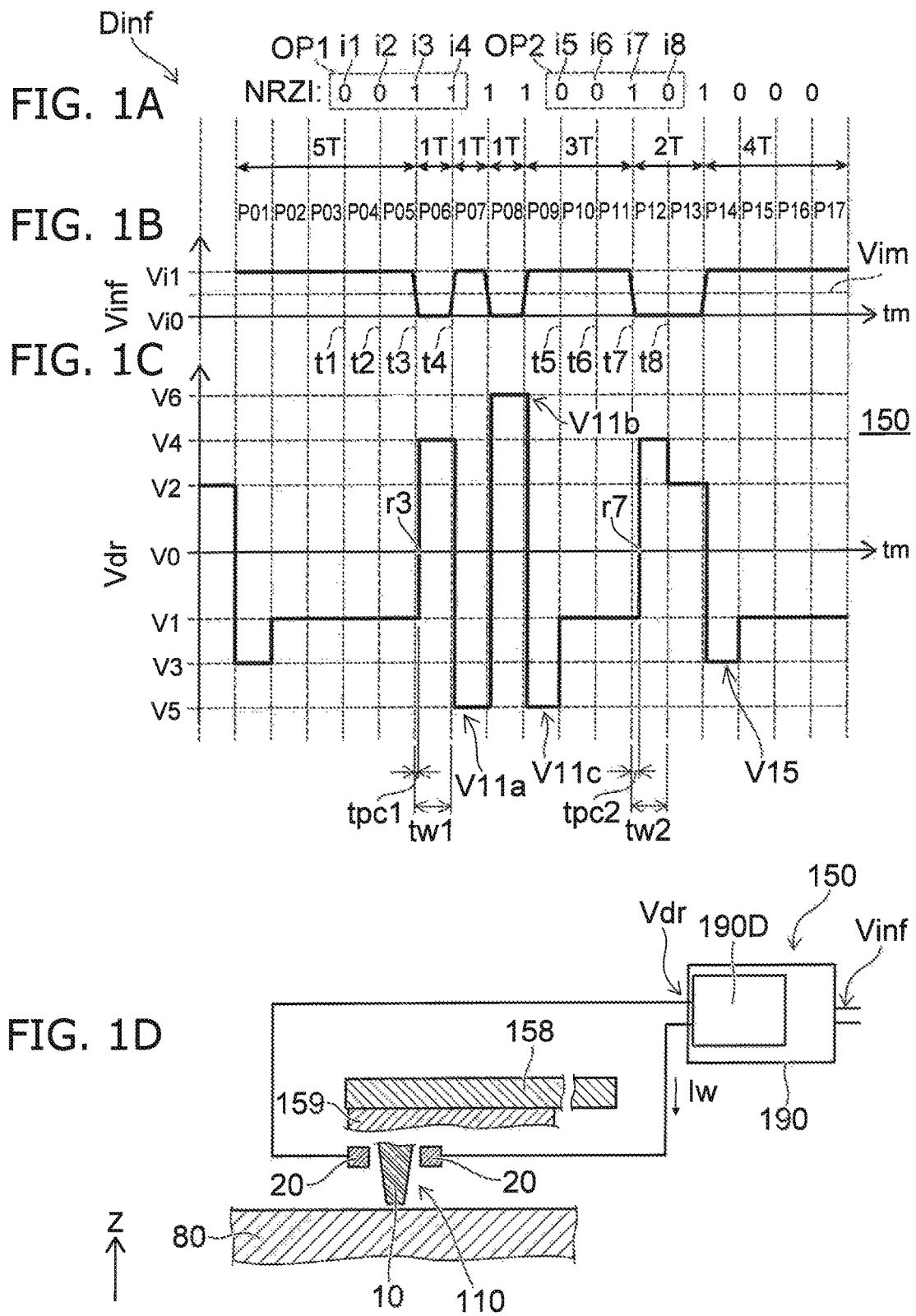

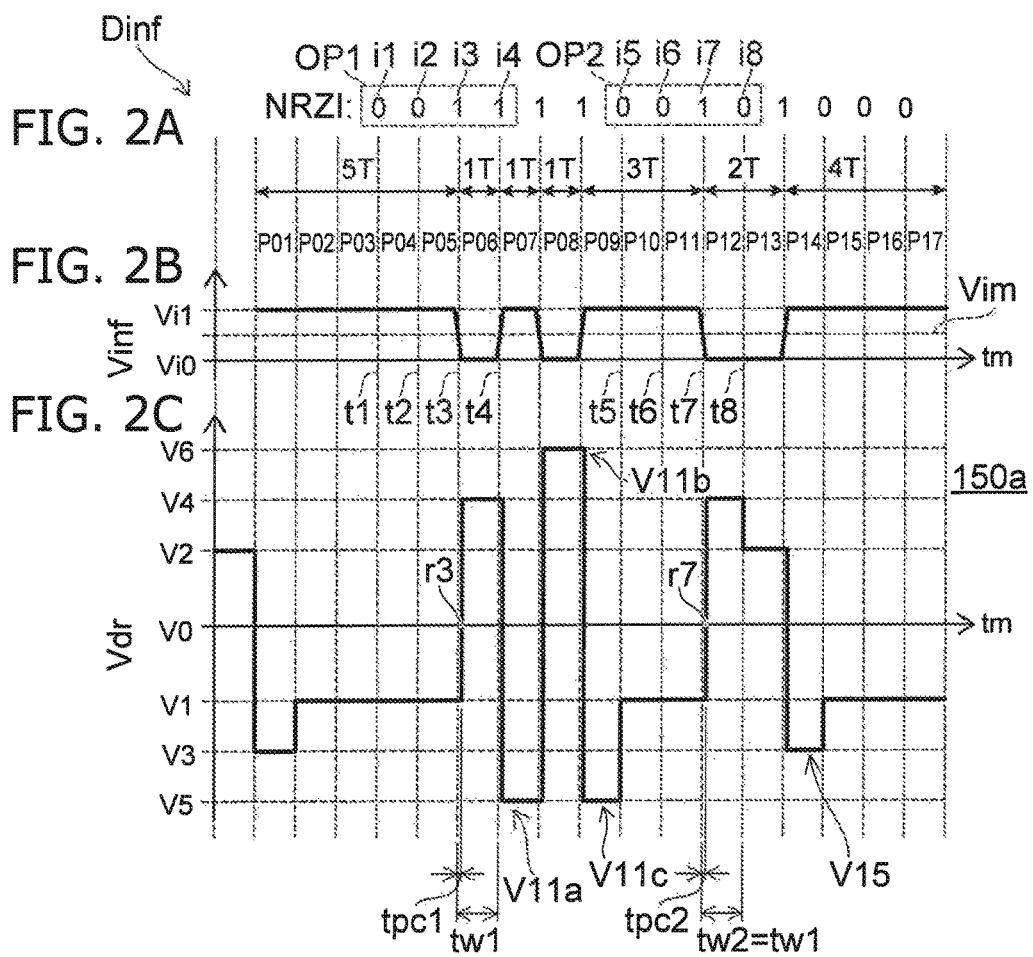

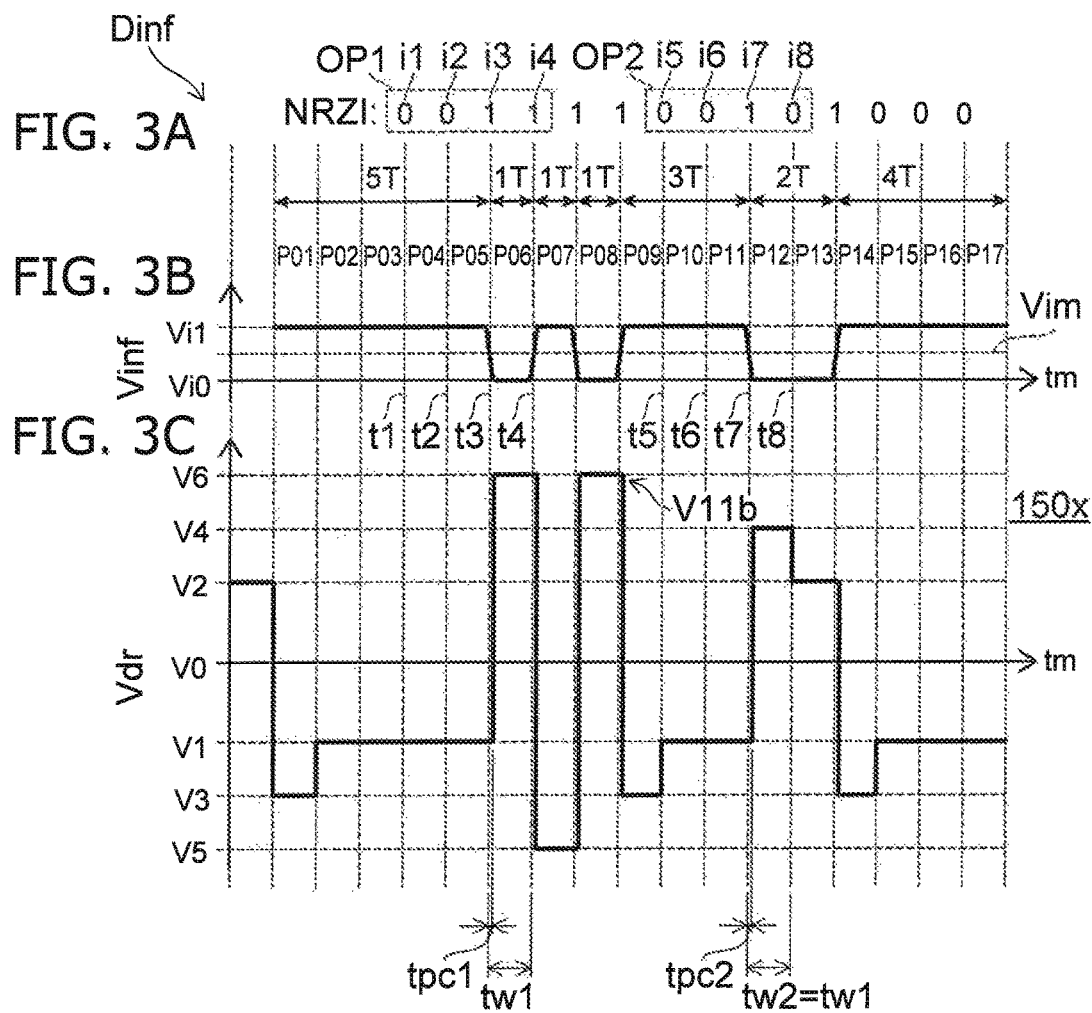

MAGNETIC RECORDING AND REPRODUCING DEVICE

CROSS-REFERENCE TO RELATED APPLICATIONS

This application is based upon and claims the benefit of priority from Japanese Patent Application No. 2017-134480, filed on Jul. 10, 2017; the entire contents of which are incorporated herein by reference.

FIELD

Embodiments described herein relate generally to a magnetic recording and reproducing device.

BACKGROUND

Information is recorded in a magnetic storage medium in a magnetic recording and reproducing device such as a HDD (Hard Disk Drive), etc. It is desirable to increase the recording density of the magnetic recording and reproducing device.

BRIEF DESCRIPTION OF THE DRAWINGS

FIG. 1A to FIG. 1D are schematic views illustrating a magnetic recording and reproducing device according to a first embodiment;

FIG. 2A to FIG. 2C are schematic views illustrating another magnetic recording and reproducing device according to the first embodiment;

FIG. 3A to FIG. 3C are schematic views illustrating a magnetic recording and reproducing device of a reference example;

DETAILED DESCRIPTION

Figure 4A:
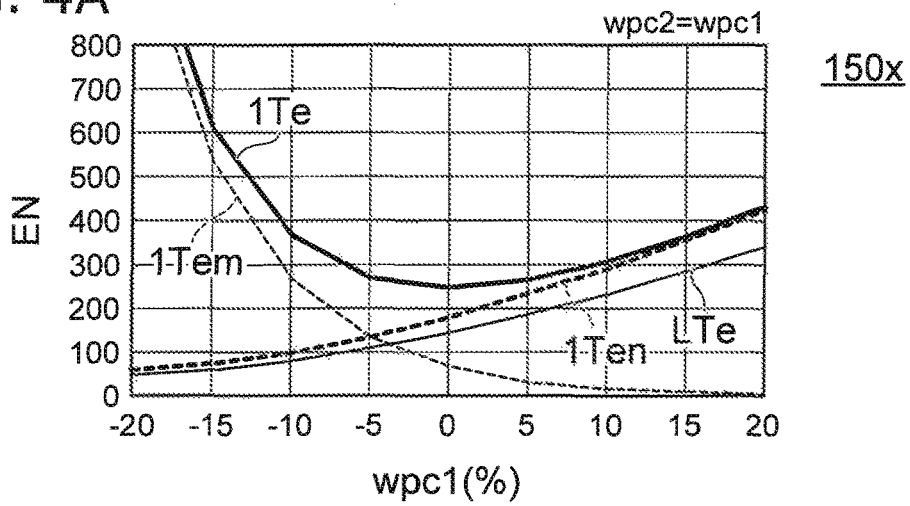
FIG. 4A to FIG. 4C are graphs illustrating characteristics of the magnetic recording and reproducing devices.

According to one embodiment, a magnetic recording and reproducing device includes an output driver, a magnetic head, and a magnetic recording medium. The output driver outputs a recording signal corresponding to input information. The magnetic head includes a coil. A recording current flows in the coil. The recording current includes the recording signal. Information is recorded in the magnetic recording medium by the magnetic head. The information corresponds to the input information. The input information includes a first information combination, a second information combination, and a third information combination. The first information combination includes first to fourth information. The second information is after the first information and is continuous with the first information. The third information is after the second information and is continuous with the second information. The fourth information is after the third information and is continuous with the third information. The first information is 0 in a NRZI code. The second information is 0 in the NRZI code. The third information is 1 in the NRZI code. The fourth information is 1 in the NRZI code. The second information combination includes fifth to eighth information. The sixth information is after the fifth information and is continuous with the fifth information. The seventh information is after the sixth information and is continuous with the sixth information. The eighth information is after the seventh information and is continuous with the seventh information. The fifth information is 0 in the NRZI code. The sixth information is 0 in the NRZI code. The seventh information is 1 in the NRZI code. The eighth information is 0 in the NRZI code. The third information combination includes ninth to twelfth information. The tenth information is after the ninth information and being continuous with the ninth information. The eleventh information is after the tenth information and is continuous with the tenth information. The twelfth information is after the eleventh information and is continuous with the eleventh information. The ninth information is 1 or 0 in the NRZI code. The tenth information is 1 in the NRZI code. The eleventh information is 1 in the NRZI code. The twelfth information is 1 or 0 in the NRZI code. The recording signal changes to an eleventh recording current to correspond to the eleventh information. The recording signal changes to a third recording current to correspond to the third information. An absolute value of the eleventh recording current is greater than an absolute value of the third recording current.

According to another embodiment, a magnetic recording and reproducing device includes an output driver, a magnetic head, and a magnetic recording medium. The output driver outputs a recording signal corresponding to input information. The magnetic head includes a coil. A recording current flows in the coil. The recording current includes the recording signal. Information is recorded in the magnetic recording medium by the magnetic head. The information corresponds to the input information. The input information includes a first information combination and a second information combination. The first information combination includes first to fourth information. The second information is after the first information and is continuous with the first information. The third information is after the second information and is continuous with the second information. The fourth information is after the third information and is continuous with the third information. The first information is 0 in a NRZI code. The second information is 0 in the NRZI code. The third information is 1 in the NRZI code. The fourth information is 1 in the NRZI code. The second information combination includes fifth to eighth information. The sixth information is after the fifth information and is continuous with the fifth information. The seventh information is after the sixth information and is continuous with the sixth information. The eighth information is after the seventh information and is continuous with the seventh information. The fifth information is 0 in the NRZI code. The sixth information is 0 in the NRZI code. The seventh information is 1 in the NRZI code. The eighth information is 0 in the NRZI code. A polarity of the recording signal changes from a first polarity to a second polarity to correspond to the third information. The second polarity is the reverse of the first polarity. The polarity of the recording signal changes from a third polarity to a fourth polarity to correspond to the seventh information. The fourth polarity is the reverse of the third polarity. A difference between a time of the third information and a time of the change from the first polarity to the second polarity is different from a difference between a time of the seventh information and a time of the change from the third polarity to the fourth polarity.

According to another embodiment, a magnetic recording and reproducing device includes an output driver, a magnetic head, and a magnetic recording medium. The output driver outputs a recording signal corresponding to input information. The magnetic head includes a coil. A recording current flows in the coil. The recording current includes the recording signal. Information is recorded in the magnetic recording medium by the magnetic head. The information corresponds to the input information. The input information includes "011X" in a NRZI code and "111X" in the NRZI code. An absolute value of the third recording current from the front of the "011X" and an absolute value of the third recording current from the front of the "111X" are greater than an absolute value of the second recording current from the front of the "011X". The "011X" is "0110" or "0111" in the NRZI code. The "111X" is "1110" or "1111" in the NRZI code.

Various embodiments will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

First Embodiment

FIG. 1A to FIG. 1D are schematic views illustrating a magnetic recording and reproducing device according to a first embodiment.

FIG. 1D is a schematic view illustrating the configuration of the magnetic recording and reproducing device. FIG. 1A shows an example of input information Dinf (data) for recording in the magnetic recording and reproducing device. FIG. 1B shows an example of an input signal Vinf corresponding to the input information Dinf. FIG. 1C illustrates a signal (a recording signal Vdr) for recording the input information Dinf. In FIG. 1B and FIG. 1C, the horizontal axis is a time tm.

As shown in FIG. 1D, the magnetic recording and reproducing device 150 according to the embodiment includes an output driver 190D, a magnetic head 110, and a magnetic recording medium 80. The magnetic head 110 includes a coil 20. The magnetic head 110 further includes a magnetic pole 10 (a main pole). For example, the magnetic head 110 is provided in a head slider 159. For example, the head slider 159 is mounted to the end portion of a head gimbal assembly 158, etc.

The magnetic head 110 is disposed to oppose the magnetic recording medium 80. For example, a direction from the magnetic recording medium 80 toward the magnetic head 110 is taken as a Z-axis direction. Recorded information is recorded in the magnetic recording medium 80 by the magnetic head 110.

The output driver 190D is electrically connected to the coil 20. A recording current Iw that is supplied from the output driver 190D flows in the coil 20. The recording current Iw includes the recording signal Vdr. A recording magnetic field is generated from the magnetic pole 10 by the recording current Iw flowing through the coil 20. The recording magnetic field is applied to the magnetic recording medium 80; and the magnetization of the magnetic recording medium 80 changes. Thereby, the information (the recorded information) is recorded in the magnetic recording medium 80. Thus, the information that corresponds to the input signal Vinf (the input information Dinf) is recorded in the magnetic recording medium 80 by the magnetic head 110.

For example, a signal processor 190 is provided in the magnetic recording and reproducing device 150. The output driver 190D corresponds to the output part of the signal processor 190. The input signal Vinf is supplied to the input part of the signal processor 190. The input signal Vinf corresponds to the information to be recorded.

The recording signal Vdr (the recording current Iw) is output from the output driver 190D. The change of the recording signal Vdr corresponds to the change of the recording current Iw. In the embodiment, there are cases where the signal distorts in the path from the output driver 190D to the coil 20. The recording signal Vdr of the output driver 190D will now be described. The distortion is relatively small in the recording signal Vdr of the output driver 190D.

A current that corresponds to the recording signal Vdr of the output driver 190D flows in the coil 20. For example, the orientation of the current (the recording current Iw) flowing in the coil 20 when the polarity of the recording signal Vdr is positive is the reverse of the orientation of the current (the recording current Iw) flowing in the coil 20 when the polarity of the recording signal Vdr is negative. The magnitude of the current flowing in the coil 20 when the absolute value of the recording signal Vdr is large is greater than the magnitude of the current flowing in the coil 20 when the absolute value of the recording signal Vdr is small.

In the information recording, for example, a NRZ (Non-Return to Zero) method and a NRZI (Non-Return to Zero Inverse) method are methods that represent logical data using a binary electrical signal. An example of the NRZI method will now be described as an example. The description recited below also is applicable to the NRZ method.

As shown in FIG. 1A and FIG. 1B, the input signal Vinf (i.e., the input information Dinf) includes a first information combination OP1 and a second information combination OP2.

The first information combination OP1 corresponds to the data of "0011" in the NRZI code. The second information combination OP2 includes the data of "0010" in the NRZI code.

As shown in FIG. 1A, first to seventeenth intervals P01 to P17 are included in the example. The length of one interval corresponds to an interval "T."

As shown in FIG. 1B, the input signal Vinf is "11111010111001111" in the first to seventeenth intervals P01 to P17. The input signal Vinf does not change in the first to fifth intervals P01 to P05. The first to fifth intervals P01 to P05 correspond to a "long T" of "5T." The input signal Vinf changes alternately in the sixth to eighth intervals P06 to P08. Each of the sixth to eighth intervals P06 to P08 is "1T." The input signal Vinf does not change in the ninth to eleventh intervals P09 to P11. The ninth to eleventh intervals P09 to P11 corresponds to a "long T" of "3T." The input signal Vinf does not change in the twelfth interval P12 and the thirteenth interval P13. The twelfth interval P12 and the thirteenth interval P13 correspond to a "long T" of "2T." The input signal Vinf does not change in the fourteenth to seventeenth intervals P14 to P17. The fourteenth to seventeenth intervals P14 to P17 corresponds to a "long T" of "4T."

Thus, various patterns exist in the input information Dinf (the input signal Vinf) input for the recording. Hereinbelow, "2T" and longer is called a "long T." "1T" corresponds to a "short T."

As shown in FIG. 1B, the input signal Vinf changes to correspond to "1" of the NRZI code. For example, the input signal Vinf having a value Vi0 corresponds to the information of "0." For example, the input signal Vinf having a value Vi1 corresponds to the information of "1." The input signal Vinf passes through an intermediate threshold Vim between the value Vi0 and the value Vi1. The time when the input signal Vinf becomes the intermediate threshold Vim is taken to be the time of the switching of the input signal Vinf.

For example, the input signal Vinf switches when the input information Dinf is "1" in the data of "0011" or "0010" of the NRZI code recited above illustrated in FIG. 1A.

For example, for the third to seventh intervals P03 to P07, the times of the boundaries of the mutually-adjacent intervals are taken as first to fourth times t1 to t4. The switching between the fifth interval P05 and the sixth interval P06 corresponds to the third time t3.

For example, the times of the boundaries of the mutually-adjacent intervals in the ninth to thirteenth intervals P09 to P13 are taken as fifth to eighth times t5 to t8. The switching between the eleventh interval P11 and the twelfth interval P12 corresponds to the seventh time t7.

Thus, the first information combination OP1 includes first to fourth information i1 to i4. The first to fourth information i1 to i4 corresponds to "0011" in the NRZI code. In other words, the second information i2 is after the first information i1 and is continuous with the first information i1. The third information i3 is after the second information i2 and is continuous with the second information i2. The fourth information i4 is after the third information i3 and is continuous with the third information i3. The first information i1 is 0 in the NRZI code. The second information i2 is 0 in the NRZI code. The third information i3 is 1 in the NRZI code. The fourth information i4 is 1 in the NRZI code. In the example, the first to fourth information i1 to i4 correspond to information relating respectively to the change of the data between each of the third to seventh intervals P03 to P07 recited above. The times of the first to fourth information i1 to i4 correspond respectively to the first to fourth times t1 to t4.

On the other hand, the second information combination OP2 includes fifth to eighth information i5 to i8. The fifth to eighth information i5 to i8 corresponds to "0010" in the NRZI code. The sixth information i6 is after the fifth information i5 and is continuous with the fifth information i5. The seventh information i7 is after the sixth information i6 and is continuous with the sixth information i6. The eighth information i8 is after the seventh information i7 and is continuous with the seventh information i7. The fifth information i5 is 0 in the NRZI code. The sixth information i6 is 0 in the NRZI code. The seventh information i7 is 1 in the NRZI code. The eighth information i8 is 0 in the NRZI code. In the example, the fifth to eighth information i5 to i8 correspond to information relating respectively to the change of the data between each of the ninth to thirteenth intervals P09 to P13 recited above. The times of the fifth to eighth information i5 to i8 correspond respectively to the fifth to eighth times t5 to t8.

The recording signal Vdr is output from the output driver 190D to correspond to the input information Dinf (the input signal Vinf) including such a first information combination OP1 and such a second information combination OP2.

As shown in FIG. 1C, for example, the polarity of the recording signal Vdr is one of negative or positive (in the example, negative) when the input signal Vinf has the value Vi1. The polarity of the recording signal Vdr is the other of negative or positive (in the example, positive) when the input signal Vinf has the value Vi0.

The polarity of the recording signal Vdr switches according to the value (the value Vi0 or the value Vi1) of the input signal Vinf. In the example, the absolute value of the recording signal Vdr in the front interval of the long T (e.g., the first interval P01 at the front of the 5T in the example of FIG. 1C) is larger than the absolute value of the recording signal Vdr in the intervals (the second to fifth intervals P02 to P05 inside the 5T) continuing from the front interval. A so-called "boost waveform" (an overshoot waveform) is used. The "boost waveform" is described below.

In the embodiment, the timing of the recording signal Vdr corresponding to the last "1" of "001" is different between the first information combination OP1 ("0011") and the second information combination OP2 ("0010").

The time of the switching of the polarity of the recording signal Vdr is the time when the recording signal Vdr becomes 0 (a value V0).

In other words, the polarity of the recording signal Vdr changes from the first polarity to the second polarity to correspond to the third information i3. The second polarity is the reverse of the first polarity. In the example, the first polarity is negative; and the second polarity is positive. Similarly, the polarity of the recording signal Vdr changes from the third polarity to the fourth polarity to correspond to the seventh information i7. The fourth polarity is the reverse of the third polarity. In the example, the third polarity is negative; and the fourth polarity is positive.

The time of the change from the first polarity to the second polarity is a time r3. For example, the recording signal Vdr changes from a negative value V1 to a positive value V4 to correspond to the third information i3. The time r3 is the time when the recording signal Vdr becomes the value V0.

The time of the change from the third polarity to the fourth polarity is a time r7. For example, the recording signal Vdr changes from the negative value V1 to the positive value V4 to correspond to the seventh information i7. The time r7 is the time when the recording signal Vdr becomes the value V0.

The time r3 when referenced to the time (the third time t3) of the third information i3 is different from the time r7 when referenced to the time (the seventh time t7) of the seventh information i7.

The difference (a time tpc1) between the third time t3 of the third information i3 and the time r3 of the change from the first polarity to the second polarity is different from the difference (a time tpc2) between the seventh time t7 of the seventh information i7 and the time r7 of the change from the third polarity to the fourth polarity.

For example, the time tpc2 is longer than the time tpc1. These times correspond to the time of the shift of the timing of the recording signal Vdr with respect to the timing of the input information Dinf (the input signal Vinf). For example, these shifts correspond to WPC (write pre-compensation).

In the embodiment, the amount of the WPC (the length of the shift time) is modified between the first information combination OP1 ("0011") and the second information combination OP2 ("0010"). In other words, the timing of the recording signal Vdr corresponding to the last "1" of "001" is modified.

For example, the time r7 of the change from the third polarity to the fourth polarity is after the seventh time t7 of the seventh information i7.

The difference (the time tpc2) between the seventh time t7 of the seventh information i7 and the time r7 of the change from the third polarity to the fourth polarity is larger than the difference (the time tpc1) between the third time t3 of the third information i3 and the time r3 of the change from the first polarity to the second polarity. For example, the time tpc2 is not less than 2 times the time tpc1.

For example, an interval tw1 between the third time t3 of the third information i3 and the fourth time t4 of the fourth information i4 corresponds to an interval of "1T." The ratio to the interval tw1 of the difference (the time tpc1) between the third time t3 of the third information i3 and the time r3 of the change from the first polarity to the second polarity is taken as a first parameter wpc1. The first parameter wpc1 is (tpc1/tw1)×100%. For example, the first parameter wpc1 corresponds to the amount (the ratio) of the WPC.

When the first parameter wpc1 is positive, the time r3 is before the third time t3. When the first parameter wpc1 is negative, the time r3 is after the third time t3.

On the other hand, an interval tw2 between the seventh time t7 of the seventh information i7 and the eighth time t8 of the eighth information i8 also corresponds to an interval of "1T." The ratio of the interval tw2 (the interval between the seventh time t7 of the seventh information i7 and the eighth time t8 of the eighth information i8) to the difference (the time tpc2) between the seventh time t7 of the seventh information i7 and the time r7 of the change from the third polarity to the fourth polarity is taken as a second parameter wpc2. The second parameter wpc2 is (tpc2/tw2)×100%. For example, the second parameter wpc2 corresponds to the amount (the ratio) of the WPC.

When the second parameter wpc2 is positive, the time r7 is before the seventh time t7. When the second parameter wpc2 is negative, the time r7 is after the seventh time t7.

The first parameter wpc1 is, for example, negative. The absolute value of the first parameter wpc1 is less than 10%. The absolute value of the first parameter wpc1 may be, for example, less than 7%. The absolute value of the first parameter wpc1 may be, for example, 2% or less. The first parameter wpc1 may be, for example, substantially 0%. The absolute value of the first parameter wpc1 may be, for example, 1% or less.

On the other hand, the second parameter wpc2 is, for example, negative. The absolute value of the second parameter wpc2 is, for example, not less than 7% and not more than 20%. The absolute value of the second parameter wpc2 may be, for example, not less than 10% and not more than 15%.

Thus, in the embodiment, the second parameter wpc2 is set to be different from the first parameter wpc1. For example, the second parameter wpc2 is negative and is smaller than the first parameter wpc1. For example, the absolute value of the second parameter wpc2 is greater than the absolute value of the first parameter wpc1.

In the embodiment, the amount (the shift time) of the WPC is modified between the "0011" and the "0010." The "001" corresponds to a long T. Whether the information after the long T is "1T" or "2T" is different between the "0011" and the "0010." The amount of the WPC is modified according to such an information pattern. Thereby, as described below, the errors of the recording of the information can be reduced even in the case where the recording density is increased. Thereby, the recording density can be increased.

An example of simulation results of the writing error amount of the magnetic recording and reproducing device will now be described.

Other than the characteristics of the magnetic recording and reproducing device 150, the characteristics of other magnetic recording and reproducing devices also will be described. In the magnetic recording and reproducing device 150, the recording signal Vdr illustrated in FIG. 1B is output.

In one example of the magnetic recording and reproducing device 150 as shown in FIG. 1B, the absolute value of the peak value of the recording signal Vdr after a 1T (NRZI) is greater than the absolute value of the peak value of the recording signal Vdr after a long T (NRZI).

For example, the recording signal Vdr has a negative value V3 in the first interval P01 corresponding to the front portion of the long T. The recording signal Vdr has the negative value V1 in the second to fifth intervals P02 to P05 corresponding to the subsequent portions of the long T. The absolute value of the value V3 is greater than the absolute value of the value V1. The recording signal Vdr has the positive value V4 in the sixth interval P06 corresponding to the 1T after the long T. The recording signal Vdr has a negative value V5 in the seventh interval P07 corresponding to the 1T after the 1T. The absolute value of the value V5 is greater than the absolute value of the value V3. The recording signal Vdr has a positive value V6 in the eighth interval P08 corresponding to the 1T after the 1T. The absolute value of the value V6 is greater than the absolute value of the value V4.

The recording signal Vdr has the negative value V5 in the ninth interval P09 corresponding to the front portion of the 2T after the 1T. The recording signal Vdr has the negative value V1 in the tenth interval P10 and the eleventh interval P11 corresponding to the subsequent portion of the 2T. The recording signal Vdr has the positive value V4 in the twelfth interval P12 corresponding to the front portion of the 2T after the long T (the 3T). The recording signal Vdr has a value V2 in the thirteenth interval P13 corresponding to the subsequent portion of the 2T. The absolute value of the value V2 is less than the absolute value of the value V4. The recording signal Vdr has the negative value V3 in the fourteenth interval P14 corresponding to the front portion of the 4T after the long T (the 2T). The recording signal Vdr has the value V1 in the fifteenth to seventeenth intervals P15 to P17 corresponding to the subsequent portions of the long T (the 3T).

Thus, the absolute value of the peak of the recording signal Vdr is modified according to the pattern of the input information Dinf (the input signal Vinf). For example, such driving corresponds to PBB (Post Bit Boost) driving. In the PBB driving, in the example shown in FIG. 1C, for example, the absolute value of the value V4 that corresponds to the sixth interval P06 is less than the absolute value of the value V6 corresponding to the eighth interval P08. In the PBB driving, "boosting" is performed when changing the polarity of the recording signal Vdr when the previous (the directly previous) information is "1T." For example, the boosting is not performed other than when the directly-previous information is "1T."

Thus, for the recording signal Vdr illustrated in FIG. 1C, the driving and the PBB driving are combined to modify the amount (the shift time) of the WPC according to the pattern of the information.

FIG. 2A to FIG. 2C are schematic views illustrating another magnetic recording and reproducing device according to the first embodiment.

FIG. 2A shows an example of the input information Dinf (the data) for recording in the magnetic recording and reproducing device. FIG. 2B shows an example of the input signal Vinf corresponding to the input information Dinf. FIG. 2C illustrates the signal (the recording signal Vdr) for recording the input information Dinf in the magnetic recording and reproducing device 150a according to the first embodiment. In FIG. 2B and FIG. 2C, the horizontal axis is the time tm.

In the magnetic recording and reproducing device 150a, the first parameter wpc1 is the same as the second parameter wpc2. In the magnetic recording and reproducing device 150a, the absolute value of the value V5 is greater than the absolute value of the value V3; and the absolute value of the value V6 is greater than the absolute value of the value V4. In other words, the PBB driving is applied to the magnetic recording and reproducing device 150a.

FIG. 3A to FIG. 3C are schematic views illustrating a magnetic recording and reproducing device of a reference example.

FIG. 3A shows an example of the input information Dinf (the data) for recording in the magnetic recording and reproducing device. FIG. 3B shows an example of the input signal Vinf corresponding to the input information Dinf. FIG. 3C illustrates the signal (the recording signal Vdr) for recording the input information Dinf in the magnetic recording and reproducing device 150x of the reference example. In FIG. 3B and FIG. 3C, the horizontal axis is the time tm.

In the magnetic recording and reproducing device 150x of the reference example, the first parameter wpc1 is the same as the second parameter wpc2. In the magnetic recording and reproducing device 150x, the value V5 illustrated in FIG. 1B is the same as the value V3; and the value V6 illustrated in FIG. 1B is the same as the value V4. In other words, the PBS driving is not performed in the magnetic recording and reproducing device 150x. In the magnetic recording and reproducing device 150x, one standard driving method (e.g., "PDW (Pattern Dependent Write driving)") is used. In the PDW driving in the example shown in FIG. 3C, for example, the sixth interval P06 has the value V6 which is the same as the value V6 corresponding to the eighth interval P08. In the standard PDW driving, for example, the absolute value of the value V3 corresponding to the ninth interval P09 is less than the absolute value of the value V5 corresponding to the seventh interval P07. In the PDW driving, the "boosting" is performed when the information is "1T" after (directly after) the polarity of the recording signal Vdr changes. The boosting is not performed other than when the directly subsequent information is "1T."

Figure 4B:
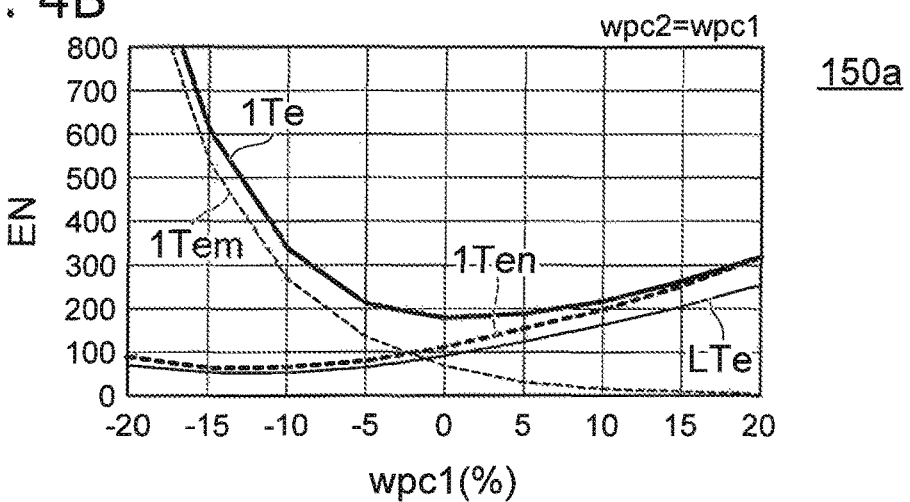
Figure 4C:
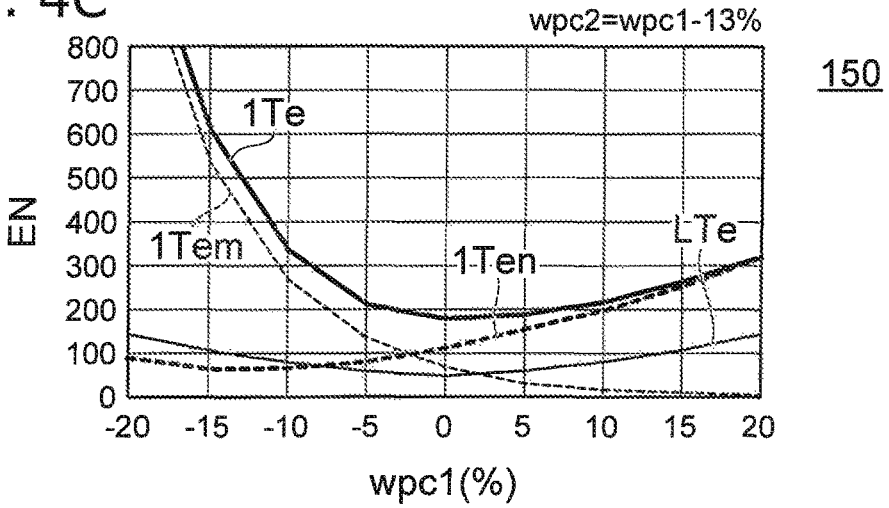

FIG. 4A to FIG. 4C are graphs illustrating characteristics of the magnetic recording and reproducing devices.

FIG. 4A to FIG. 4C show simulation results of the characteristics of the magnetic recording and reproducing devices 150x, 150a, and 150. The first parameter wpc1 recited above is modified in the simulation. In these figures, the horizontal axis is the first parameter wpc1. When the first parameter wpc1 is negative, the timing of the recording signal Vdr is after the timing of the input signal Vinf. When the first parameter wpc1 is positive, the timing of the recording signal Vdr is before the timing of the input signal Vinf. The vertical axis is an error number EN. The error number EN is the number of errors occurring when writing $5 \times 10^4$ bits. For example, "EN/$5 \times 10^4$" corresponds to the error rate.

The characteristic of a NLTS error 1Ten and the characteristic of a 1T missing error 1Tem are shown in these figures. The magnetization that is written to correspond to the "1" of the third information i3 included in "001" in the NRZI code is affected by the "00" of the previous long T. In other words, the magnetization that is written to correspond to the "1" of the third information i3 shifts to before the timing of the input signal Vinf. In other words, an error that is caused by the NLTS (non linear transition shift) occurs. The error that is caused by the NLTS corresponds to the NLTS error 1Ten.

On the other hand, it is considered that the record error caused by the NLTS is improved by setting the timing of the recording signal Vdr to shift to after the timing of the input signal Vinf. In other words, the WPC that shifts the timing of the recording signal Vdr later is performed. However, the interval of the subsequent recording signal Vdr becomes short when the timing of the recording signal Vdr shifts to after the timing of the input signal Vinf. An error that is caused by the interval of the recording signal Vdr becoming short corresponds to the 1T missing error 1Tem.

The characteristic of a 1T error 1Te also is shown in FIG. 4A to FIG. 4C. The error number EN of the 1T error 1Te is the sum of the error number EN of the NLTS error 1Ten and the error number EN of the 1T missing error 1Tem.

A long T error LTe for the long T also is shown in these figures. The long T error LTe corresponds to the error number EN when recording the input information Dinf of 2T, the input information Dinf of 3T, and the input information Dinf of 4T.

In the magnetic recording and reproducing device 150x of the reference example shown in FIG. 4A, the second parameter wpc2 is the same as the first parameter wpc1. The error number EN of the NLTS error 1Ten is small when the first parameter wpc1 is negative and the absolute value of the first parameter wpc1 is large. This corresponds to the NLTS errors not occurring easily due to the WPC. On the other hand, the error number EN of the 1T missing error 1Tem increases abruptly when the first parameter wpc1 is negative and the absolute value of the first parameter wpc1 becomes large. This corresponds to the time of the "1T" after the long T becoming short and normal recording being difficult to obtain due to the WPC.

Thus, in the magnetic recording and reproducing device 150x of the reference example, a trade-off occurs between the error number EN of the NLTS error 1Ten and the error number EN of the 1T missing error 1Tem. In the magnetic recording and reproducing device 150x, the error number EN of the 1T error 1Te is a minimum when the first parameter wpc1 is about 0%. The minimum value of the error number EN of the 1T error 1Te is about 250.

On the other hand, in the magnetic recording and reproducing device 150x of the reference example, the error number EN of the long T error LTe increases when the first parameter wpc1 is positive and the first parameter wpc1 becomes large. The error number EN of the long T error LTe is about 150 for the first parameter wpc1 (about 0%) at which the error number EN of the 1T error 1Te is a minimum. Thus, in the magnetic recording and reproducing device 150x of the reference example, the total error number EN of the "1T" and the long T is about 400.

In the magnetic recording and reproducing device 150a shown in FIG. 4B, the amount of the WPC is a constant; and the second parameter wpc2 is the same as the first parameter wpc1. The PBB driving recited above is performed in the magnetic recording and reproducing device 150a. In the magnetic recording and reproducing device 150a as well, the error number EN of the NLTS error 1Ten decreases when the first parameter wpc1 is negative and the absolute value of the first parameter wpc1 becomes large. On the other hand, the error number EN of the 1T missing error 1Tem increases abruptly when the first parameter wpc1 is negative and the absolute value of the first parameter wpc1 becomes large. In the magnetic recording and reproducing device 150a, the error number EN of the 1T error 1Te is a minimum when the first parameter wpc1 is about 0%. The minimum value of the error number EN of the 1T error 1Te is about 190.

On the other hand, in the magnetic recording and reproducing device 150a as well, the error number EN of the long T error LTe increases when the first parameter wpc1 is positive and the first parameter wpc1 becomes large. The error number EN of the long T error LTe is about 110 for the first parameter wpc1 (about 0%) at which the error number EN of the 1T error 1Te is a minimum. In the magnetic recording and reproducing device 150a, the total error number EN of the "1T" and the long T is about 300.

Similarly to the magnetic recording and reproducing device 150x, in the magnetic recording and reproducing device 150a as well, the error number EN of the long T error LTe and the error number of the 1T error 1Ten are minimums when the first parameter wpc1 is negative. In the magnetic recording and reproducing device 150a, these values of the long T error LTe and the 1T error 1Ten are small compared to these values for the magnetic recording and reproducing device 150x. Therefore, compared to the magnetic recording and reproducing device 150x, the trade-off between the error number EN of the NLTS error 1Ten and the error number EN of the 1T missing error 1Tem is improved for the magnetic recording and reproducing device 150a. Accordingly, compared to the magnetic recording and reproducing device 150x, the total error number EN of the "1T" and the long T is improved for the magnetic recording and reproducing device 150a.

The NLTS increases when the absolute value of the recording signal Vdr is large. In the magnetic recording and reproducing device 150x, the absolute value of the recording signal Vdr at the third time t3 when the NLTS is largest is the same as the absolute value of the recording signal Vdr at the fourth time t4 when the NLTS is smallest. Conversely, in the magnetic recording and reproducing device 150a, the absolute value of the recording signal Vdr at the third time t3 is less than the absolute value of the recording signal Vdr at the fourth time t4. Thereby, the difference between the maximum NLTS and the minimum NLTS is small. Thereby, in the magnetic recording and reproducing device 150a, the NLTS relatively decreases at the third time t3. Thereby, compared to the magnetic recording and reproducing device 150x, the trade-off between the error number EN of the NLTS error 1Ten and the error number EN of the 1T missing error 1Tem is improved for the magnetic recording and reproducing device 150a.

In the magnetic recording and reproducing device 150 shown in FIG. 4C, the amount of the WPC is different according to the input information Dinf. In the magnetic recording and reproducing device 150, the second parameter wpc2 is negative; and the absolute value of the second parameter wpc2 is greater than the absolute value of the first parameter wpc1. In the example, the second parameter wpc2 is the first parameter wpc1 −13%. At the horizontal axis of FIG. 4C, the second parameter wpc2 is −13% when the first parameter wpc1 is 0%. In the magnetic recording and reproducing device 150, the PBB driving recited above is performed. The characteristics of the NLTS error 1Ten and the 1T missing error 1Tem of the magnetic recording and reproducing device 150 are similar to the characteristics of the magnetic recording and reproducing device 150a. In the magnetic recording and reproducing device 150, the error number EN of the 1T error 1Te is a minimum when the first parameter wpc1 is about 0%. The minimum value of the error number EN of the 1T error 1Te is about 190.

On the other hand, in the magnetic recording and reproducing device 150 as well, the error number EN of the long T error LTe decreases when the first parameter wpc1 is substantially 0% (i.e., when the second parameter wpc2 is −13%). The error number EN of the long T error LTe is a minimum when the first parameter wpc1 is substantially 0%. The minimum value of the error number EN of the long T error LTe is about 50. In the magnetic recording and reproducing device 150, the total error number EN of the "1T" and the long T is about 240.

Thus, for the magnetic recording and reproducing device 150a, compared to the magnetic recording and reproducing device 150x, the minimum value of the error number EN of the 1T error 1Te can be small; and the error number EN of the long T error LTe also can be small.

Further, compared to the magnetic recording and reproducing device 150a, the error number EN of the long T error LTe can be small for the magnetic recording and reproducing device 150.

Figure 5:
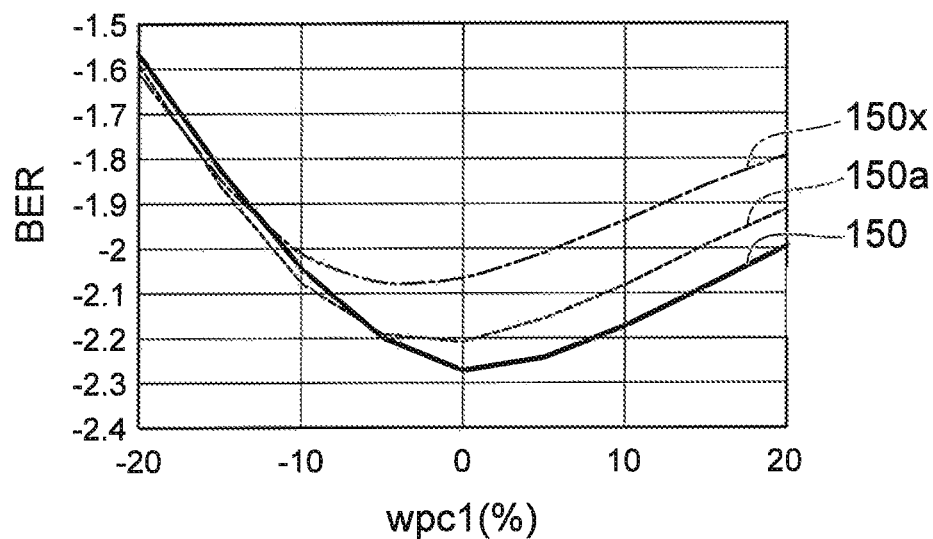
FIG. 5 is a graph illustrating characteristics of the magnetic recording and reproducing devices.

FIG. 5 is a graph illustrating characteristics of the magnetic recording and reproducing devices.

FIG. 5 shows simulation results of the characteristics of the magnetic recording and reproducing devices 150x, 150a, and 150 recited above. The horizontal axis of FIG. 5 is the first parameter wpc1. The vertical axis is a bit error rate BER. The bit error rate BER is $\log_{10}$ (total error number EN/write total bit count). The bit error rate BER includes the components of the 1T error 1Te (the NLTS error 1Ten and the 1T missing error 1Tem) and the long T error LTe recited above. The errors are few when the bit error rate BER is negative and the absolute value of the bit error rate BER is large.

As shown in FIG. 5, the minimum value of the bit error rate BER of the magnetic recording and reproducing device 150x is about −2.08. The minimum value of the bit error rate BER of the magnetic recording and reproducing device 150a is about −2.21. The minimum value of the bit error rate BER of the magnetic recording and reproducing device 150 is about −2.27.

For the magnetic recording and reproducing device 150x, the bit error rate BER is the minimum value when the first parameter wpc1 is about −4%. For the magnetic recording and reproducing device 150a and the magnetic recording and reproducing device 150, the bit error rate BER is the minimum value when the first parameter wpc1 is substantially 0%.

As recited above, the error number EN can be small by performing driving that modifies the amount of the WPC at the time r3 and the amount of the WPC at the time r7 (e.g., the difference of the shift time). This corresponds to the difference between the error numbers EN of the magnetic recording and reproducing device 150a and the magnetic recording and reproducing device 150.

The error number EN also can be small by performing the PBB driving. This corresponds to the difference between the error numbers EN of the magnetic recording and reproducing device 150x and the magnetic recording and reproducing device 150a.

An example of the PBB driving illustrated in FIG. 1C and FIG. 2C will now be described.

In the PBB driving, the absolute value of the recording signal Vdr corresponding to the third "1" from the front of the information of "011X" and "111X" in the NRZI code is greater than the absolute value of the recording signal Vdr corresponding to the third "1" of the information of "001X" or "101X" in the NRZI code. The "X" recited above is "1" or "0."

The example shown in FIG. 1C and FIG. 2C will now be described.

For example, the input information Dinf includes a third information combination. The third information combination is "0111," "0110," "1111," or "1110." Namely, the third information combination includes ninth to twelfth information. The tenth information is after the ninth information and is continuous with the ninth information. The eleventh information is after the tenth information and is continuous with the tenth information. The twelfth information is after the eleventh information and is continuous with the eleventh information. The ninth information is 1 or 0 in the NRZI code. The tenth information is 1 in the NRZI code. The eleventh information is 1 in the NRZI code. The twelfth information is 1 or 0 in the NRZI code.

For example, focusing on the region between the fourth to eighth intervals P04 to P08, the information is "0111" in the NRZI code. The third information combination corresponds to the information of this "0111." For example, the eleventh information corresponds to the third "1" of the "0111."

On the other hand, as described above, the first information combination OP1 is "0011." The third "1" of this "0011" corresponds to the third information i3.

In the example shown in FIG. 1C and FIG. 2C, the recording signal Vdr changes to an eleventh recording current (a value V11a) to correspond to the eleventh information. The value V11a is the value V5. In other words, between the sixth interval P06 and the seventh interval P07, the recording signal Vdr is the eleventh recording current (the value V11a, i.e., the negative value V5).

On the other hand, the recording signal Vdr changes to a third recording current (in the example, the value V4) to correspond to the third information i3.

Thus, the absolute value of the eleventh recording current (the value V11a, i.e., the negative value V5) is greater than the absolute value of the third recording current (the value V3).

As described above, the second information combination OP2 is "0010" in the NRZI code. The seventh information i7 corresponds to the third "1" of this "0010." The recording signal Vdr changes to the seventh recording current (in the example, the value V4) to correspond to the seventh information i7. In such a case, the absolute value of the eleventh recording current (the value V11a) is greater than the absolute value of the seventh recording current (the value V4).

For example, focusing on the region between the fifth to ninth intervals P05 to P09, the information is "1111" in the NRZI code. The third information combination corresponds to the information of this "1111." For example, the eleventh information corresponds to the third "1" from the front of the "1111." In such a case, the recording signal Vdr changes to the eleventh recording current (a value V11b) to correspond to the eleventh information. The value V11b is the value V6. Thus, between the seventh interval P07 and the eighth interval P08, the recording signal Vdr changes to the eleventh recording current (a value V11b, i.e., the value V6). Even in such a case, the absolute value of the eleventh recording current (the value V11b, i.e., the negative value V6) is greater than the absolute value of the third recording current (the value V4). The absolute value of the eleventh recording current (the value V11b) is greater than the absolute value of the seventh recording current (the value V4).

For example, focusing on the region between the sixth to tenth intervals P06 to P10, the information is "1110" in the NRZI code. The third information combination corresponds to the information of this "1110." For example, the eleventh information corresponds to the third "1" from the front of the "1110." In such a case, the recording signal Vdr changes to the eleventh recording current (a value V11c) to correspond to the eleventh information. The value V11c is the value V5. Thus, between the eighth interval P08 and the ninth interval P09, the recording signal Vdr changes to the eleventh recording current (a value V11c, i.e., the value V5). Even in such a case, the absolute value of the eleventh recording current (the value V11c, i.e., the negative value V6) is greater than the absolute value of the third recording current (the value V4). The absolute value of the eleventh recording current (the value V11c) is greater than the absolute value of the seventh recording current (the value V4).

The input information Dinf may further include a fourth information combination. The fourth information combination is "1011" or "1010." In other words, the fourth information combination includes the thirteenth to sixteenth information. The fourteenth information is after the thirteenth information and is continuous with the thirteenth information. The fifteenth information is after the fourteenth information and is continuous with the fourteenth information. The sixteenth information is after the fifteenth information and is continuous with the fifteenth information. The thirteenth information is 1 in the NRZI code. The fourteenth information is 0 in the NRZI code. The fifteenth information is 1 in the NRZI code. The sixteenth information is 1 or 0 in the NRZI code.

For example, focusing on the region between the eleventh to fifteenth intervals P11 to P15, the information is "1010" in the NRZI code. The fourth information combination corresponds to the information of this "1010." For example, the fifteenth information corresponds to the third "1" from the front of the "1010." The recording signal Vdr changes to the fifteenth recording current (a value V15) to correspond to the fifteenth information. In the example, the value V15 is the value V3.

On the other hand, as described above, the recording signal Vdr that corresponds to the third "1" from the front of the third information combination ("0111," "0110," "1111," or "1110") is the eleventh recording current (the value V11a, V11b, V11c, or the like). The absolute value of the eleventh recording current is greater than the absolute value of the fifteenth recording current (the value V15).

By the PBB driving having such values, the error number EN can be reduced. For example, the error number EN of the magnetic recording and reproducing device 150a can be reduced more than the error number EN of the magnetic recording and reproducing device 150x.

In the embodiment, for example, the ratio to the absolute value of the third recording current of the difference between the absolute value of the eleventh recording current (e.g., the value V11a) and the absolute value of the third recording current (e.g., the value V4) is 5% or more (0.05 or more). For example, the ratio may be 30% or less. The ratio may be 20% or less. The ratio may be 15% or less. As described below, for example, the bit error rate BER can be improved effectively.

In the embodiment, for example, the input information Dinf includes "011X" in the NRZI code and "111X" in the NRZI code. The "011X" is "0110" or "0111" in the NRZI code. The "111X" is "1110" or "1111" in the NRZI code. In the embodiment, the absolute value of the third recording signal Vdr from the front of the "011X" is greater than the absolute value of the second recording signal Vdr from the front of the "011X." The absolute value of the third recording signal Vdr from the front of the "111X" is greater than the absolute value of the second recording current Vdr from the front of the "011X."

An example of the characteristics of the magnetic recording and reproducing device will now be described.

The change of the bit error rate BER for the magnetic recording and reproducing device 150a is determined by a simulation calculation when modifying the value V3, the value V4, the value V5, and the value V6 (referring to FIG. 2C). In the example, the first parameter wpc1 is the same as the second parameter wpc2.

In the calculation, recording at 2160 kBPI is assumed. In such a case, the shortest bit length is 11.76 nsec. The relative speed between the magnetic head 110 and the magnetic recording medium 80 is 33.6 m/sec. The transfer speed of the data is 2.86 Gbps. The absolute value of the base current (the value V1 and the value V2 referring to FIG. 2C) of the recording current Iw is 40 mA. The absolute value of the base overshoot current (the current value in the second interval P02 and the current value in the twelfth interval P12 referring to FIG. 2C) is 60 mA.

Thus, the base current of the recording current Iw and the base overshoot current are fixed in the simulation calculation. Also, in the calculation, the current value that corresponds to the sixth interval P06 (in the example of FIG. 2C, the value V4) and the current value that corresponds to the eighth interval P08 (in the example of FIG. 2C, the value V6) are modified. Here, an evaluation parameter $\Delta V1$ is introduced.

$$\Delta V1 = ((V6-V4)/V4) \times 100\%.$$

Figure 6:
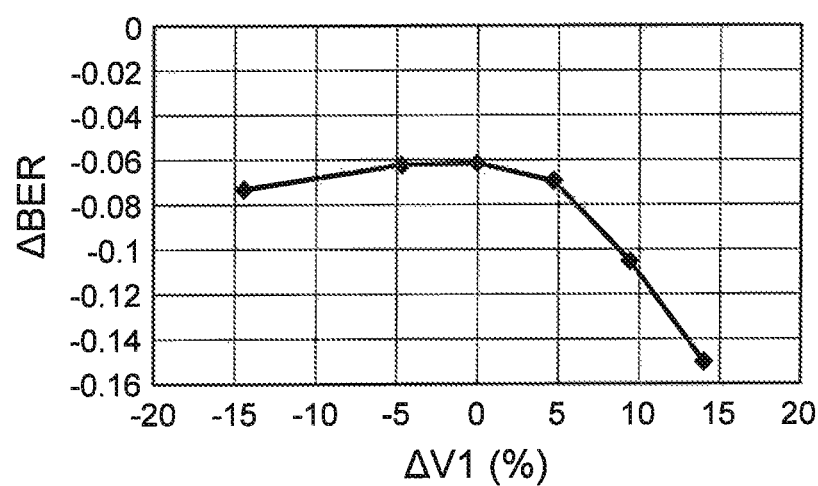
FIG. 6 is a graph illustrating a characteristic of the magnetic recording and reproducing device.

FIG. 6 is a graph illustrating a characteristic of the magnetic recording and reproducing device.

The horizontal axis of FIG. 6 is the evaluation parameter $\Delta V1$ (%). The vertical axis of FIG. 6 is a change amount $\Delta BER$ of the bit error rate BER. The change amount $\Delta BER$ is the change amount of the bit error rate BER when referenced to the bit error rate BER of the magnetic recording and reproducing device 150x. A large absolute value of the change amount $\Delta BER$ (negative) corresponds to a low bit error rate BER.

It can be seen from FIG. 6 that the change amount $\Delta BER$ decreases abruptly when the evaluation parameter $\Delta V1$ is positive and becomes 5% or more. Therefore, it can be seen that it is good for the absolute value of the value V6 to be greater than the absolute value of the value V4. Also, it is favorable for the ratio "(V6−V4)/V4" to be 5% or more. Similarly, it can be seen that it is good for the absolute value of the value V5 to be greater than the absolute value of the value V3. Then, it is favorable for the ratio "(V5−V3)/V3" to be 5% or more. For example, it is favorable for the ratio "(|V6|−|V3|)/|V3|" to be 5% or more. For example, it is favorable for the ratio "(|V5|−V4|)/|V4|" to be 5% or more. These ratios may be, for example, 15% or less.

Figure 7:
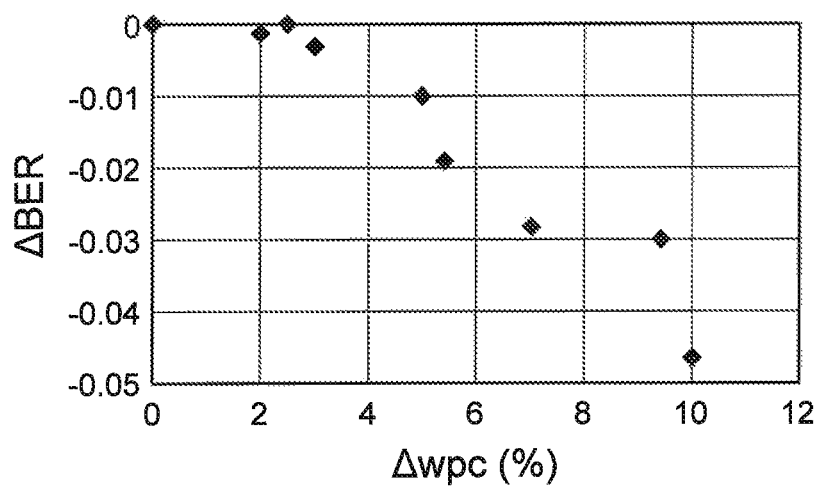
FIG. 7 is a graph illustrating a characteristic of the magnetic recording and reproducing device.

FIG. 7 is a graph illustrating a characteristic of the magnetic recording and reproducing device.

The horizontal axis of FIG. 7 is a difference $\Delta wpc$ (%) of the wpc amount. $\Delta wpc$ (%) is the difference between the second parameter wpc2 (%) and the first parameter wpc1 (%). In the example, the first parameter wpc1 (%) and the second parameter wpc2 (%) are positive. The vertical axis of FIG. 7 is the change amount $\Delta BER$ of the bit error rate BER. In FIG. 7, the change amount $\Delta BER$ is the change amount of the bit error rate BER when referenced to the bit error rate BER of the magnetic recording and reproducing device 150a. A large absolute value of the change amount $\Delta BER$ (negative) corresponds to a low bit error rate BER.

It can be seen from FIG. 7 that the change amount $\Delta BER$ starts to decrease when the difference $\Delta wpc$ becomes greater than 2% (i.e., 0.02). It is favorable for the difference $\Delta wpc$ to be 2% or more (0.02). The decrease of the change amount $\Delta BER$ becomes pronounced when the difference $\Delta wpc$ becomes 5% or more. The change amount $\Delta BER$ is extremely low when the difference $\Delta wpc$ is 10%. In the embodiment, it is more favorable for the difference $\Delta wpc$ to be 5% or more (0.05 or more). The difference $\Delta wpc$ may be 15% or less (0.15 or less). The difference $\Delta wpc$ may be 10% or less (0.1 or less).

In the embodiment, the shape of the recording current Iw is modified from the conventional waveform of the recording current Iw. Thereby, the characteristics of the magnetic recording and reproducing device at a high transfer speed is improved. For example, the errors of the magnetic recording and reproducing device are suppressed even in the case where the recording density is increased. Thereby, the recording density can be increased.

For example, the front bit after the long bit (the long T) is shifted forward when recorded. In other words, NLTS occurs. As a method for suppressing the reproduction errors caused by the NLTS, there is a method (WPC) of rearwardly shifting the recording position after the long bit. When a short bit (1T) is recorded after the long bit, if the amount of the WPC becomes large, the recording time of the subsequent "1T" becomes excessively short. In other words, it was found that 1T missing errors occur. A trade-off occurs between the 1T missing errors and the NLTS. Therefore, it is difficult to sufficiently suppress the reproduction errors.

In the embodiment, the amount of the WPC (the length of the shift time) is modified according to the pattern of the input information Dinf (or the input signal Vinf) to be recorded. For example, the amount of the WPC is modified between "0011" and "0010" in the NRZI code. For example, the bits (the information) before and after performing the WPC are stored in a register. Thereby, the recording location of the "0011" and the "0010" can be designated. The amount of the WPC is modified according to the recording location.

Second Embodiment

In the embodiment, the amount (the shift time) of the WPC is modified according to the pattern of the information. The PBB driving may not be applied in the embodiment.

Figure 8:
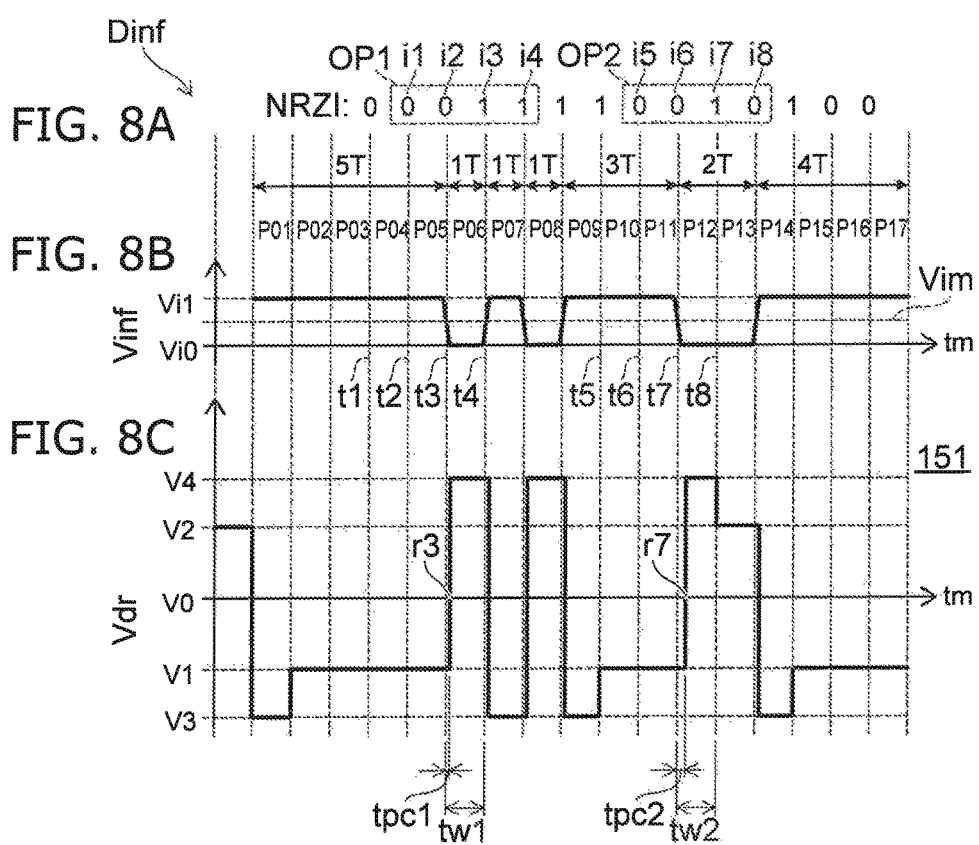
FIG. 8A to FIG. 8C are schematic views illustrating a magnetic recording and reproducing device according to a second embodiment.

FIG. 8A to FIG. 8C are schematic views illustrating a magnetic recording and reproducing device according to the second embodiment.

FIG. 8A shows an example of the input information Dinf (the data). FIG. 8B shows an example of the input signal Vinf. FIG. 8C illustrates the recording signal Vdr.

In the second embodiment as well, the input information Dinf includes the first information combination OP1 and the second information combination OP2. The first information combination OP1 (the first to fourth information i1 to i4) is "0011" in the NRZI code. The second information combination OP2 (the fifth information i5 to i8) is "0010" in the NRZI code. The polarity of the recording signal Vdr changes from the first polarity to the second polarity to correspond to the third information i3. The polarity of the recording signal Vdr changes from the third polarity to the fourth polarity to correspond to the seventh information i7. The difference (the time tpc1) between the third time t3 of the third information i3 and the time r3 of the change from the first polarity to the second polarity is different from the difference (the time tpc2) between the seventh time t7 of the seventh information i7 and the time r7 of the change from the third polarity to the fourth polarity. The errors are suppressed by such a driving waveform. The recording density can be increased.

An example of the magnetic recording and reproducing devices according to the first and second embodiments will now be described.

Figure 9:
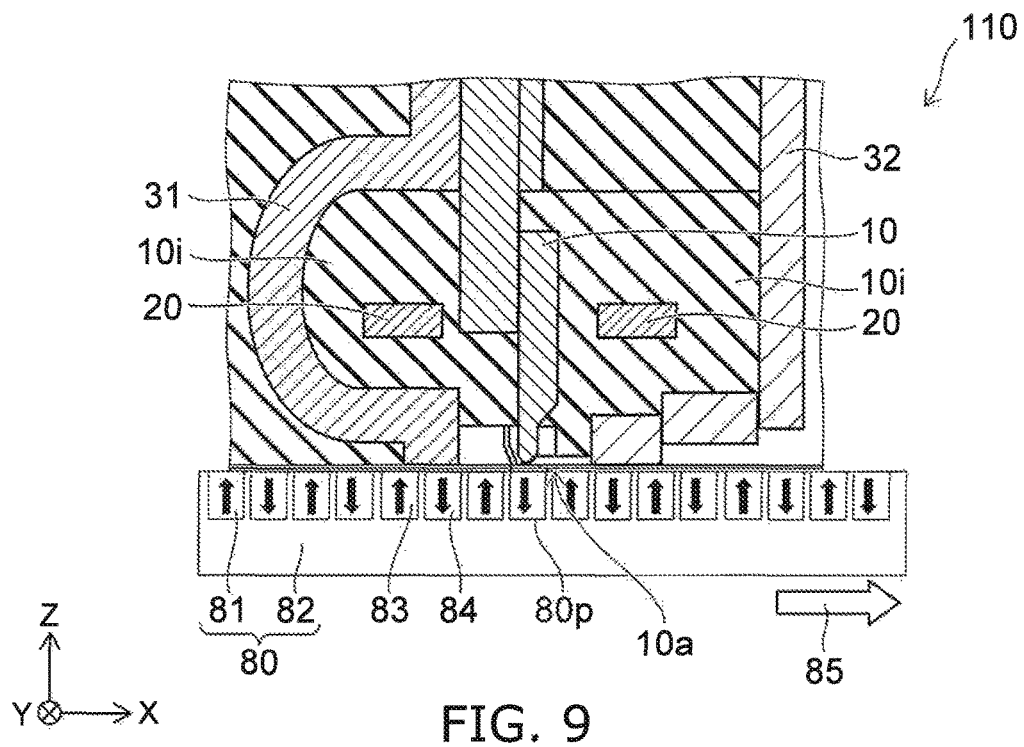
FIG. 9 is a schematic cross-sectional view illustrating a portion of the magnetic recording and reproducing device according to the embodiment.

FIG. 9 is a schematic cross-sectional view illustrating a portion of the magnetic recording and reproducing device according to the embodiment.

FIG. 9 illustrates the magnetic head 110.

As shown in FIG. 9, the magnetic head 110 includes a first shield 31, a second shield 32, and an insulating portion 10i in addition to the magnetic pole 10 and the coil 20. The magnetic pole 10 and the coil 20 are provided between the first shield 31 and the second shield 32. For example, the insulating portion 10i covers at least a portion of each of the magnetic pole 10, the coil 20, the first shield 31, and the second shield 32 and the regions between these components.

The magnetic head 110 is disposed to oppose the magnetic recording medium 80. The magnetic head 110 has a medium-opposing surface 10a (an ABS (Air Bearing Surface)). Flux that is generated from the magnetic pole 10 is applied to the magnetic recording medium 80; and information is recorded in the magnetic recording medium 80.

One direction perpendicular to the Z-axis direction is taken as an X-axis direction. A direction perpendicular to the Z-axis direction and the X-axis direction is taken as a Y-axis direction.

The track width direction (the Y-axis direction) is substantially parallel to the medium-opposing surface 10a. The magnetic recording medium 80 includes, for example, a medium substrate 82 and a magnetic recording layer 81. The magnetic recording layer 81 is provided on the medium substrate 82. Multiple recording bits 84 are provided in the magnetic recording layer 81. The magnetic recording medium 80 moves relative to the magnetic head 110 along a medium movement direction 85. For example, the medium movement direction 85 is aligned with a second direction (the X-axis direction). A reproducing part (not illustrated) that senses the direction of a magnetization 83 may be further provided in the magnetic head 110.

Figure 10:
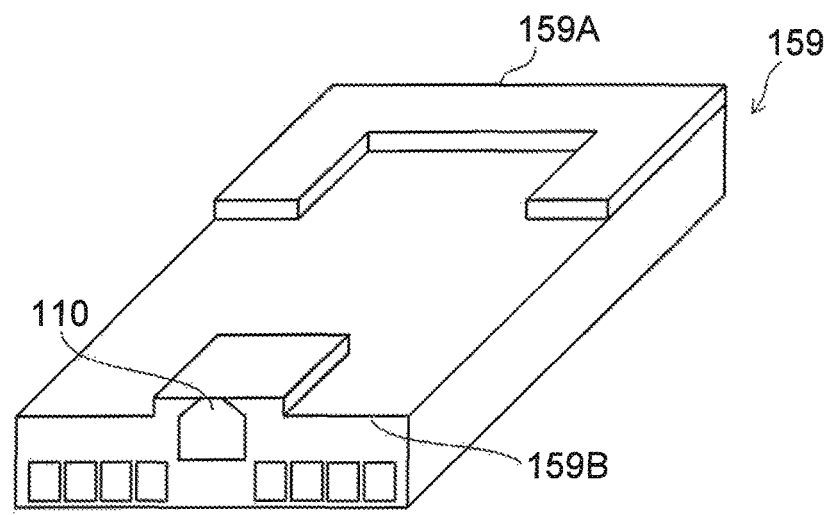
FIG. 10 is a schematic perspective view illustrating a portion of the magnetic recording and reproducing device according to the embodiment.

FIG. 10 is a schematic perspective view illustrating a portion of the magnetic recording and reproducing device according to the embodiment.

FIG. 10 illustrates a head slider.

The magnetic head 110 is provided in the head slider 159. The head slider 159 includes, for example, Al$_2$O$_3$/TiC, etc. The head slider 159 moves relative to the magnetic recording medium while flying over or contacting the magnetic recording medium.

The head slider 159 has, for example, an air inflow side 159A and an air outflow side 159B. The magnetic head 110 is disposed at the side surface of the air outflow side 159B of the head slider 159 or the like. Thereby, the magnetic head 110 moves relative to the magnetic recording medium while flying over or contacting the magnetic recording medium.

Figure 11:
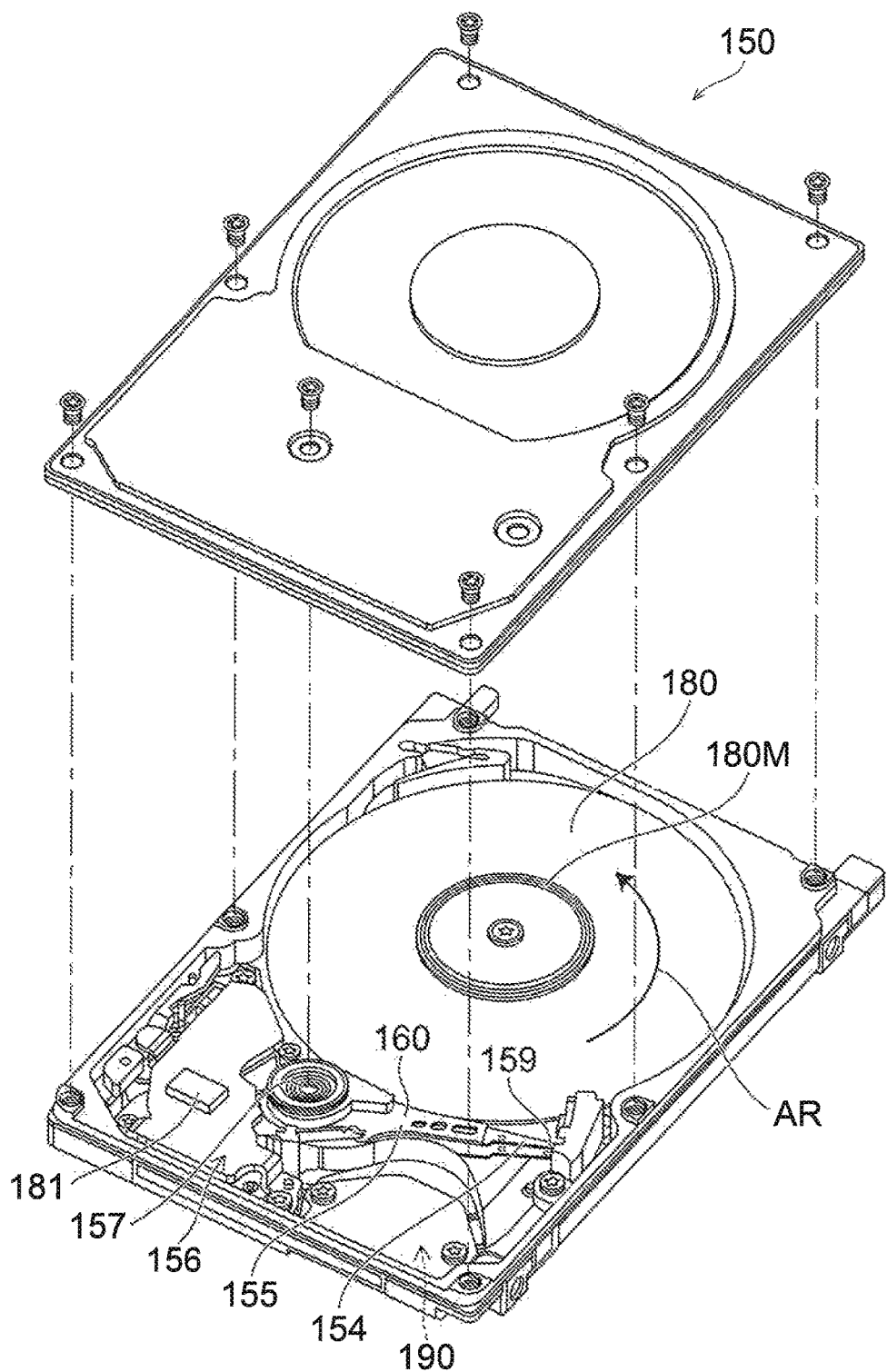
FIG. 11 is a schematic perspective view illustrating the magnetic recording and reproducing device according to the embodiment.

FIG. 11 is a schematic perspective view illustrating the magnetic recording and reproducing device according to the embodiment.

Figure 12A:
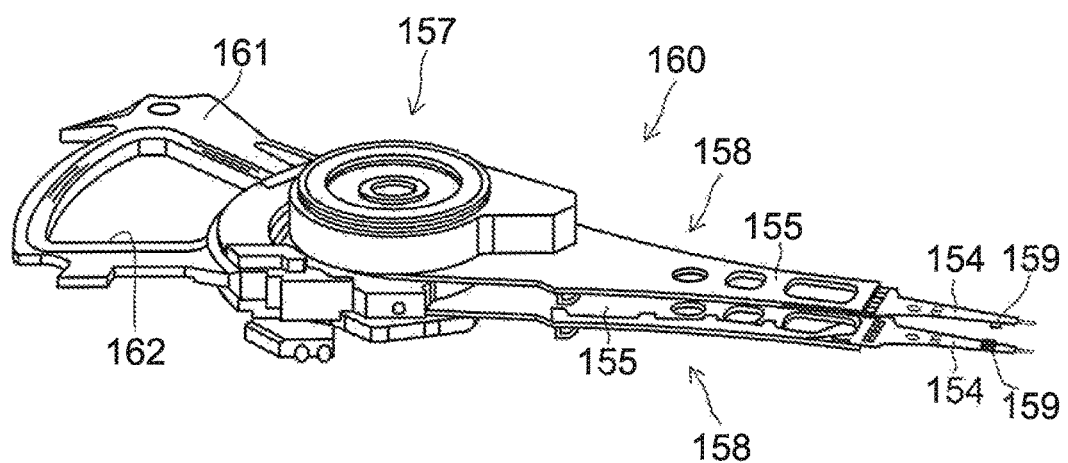
FIG. 12A and FIG. 12B are schematic perspective views illustrating a portion of the magnetic recording and reproducing device according to the embodiment.
Figure 12B:
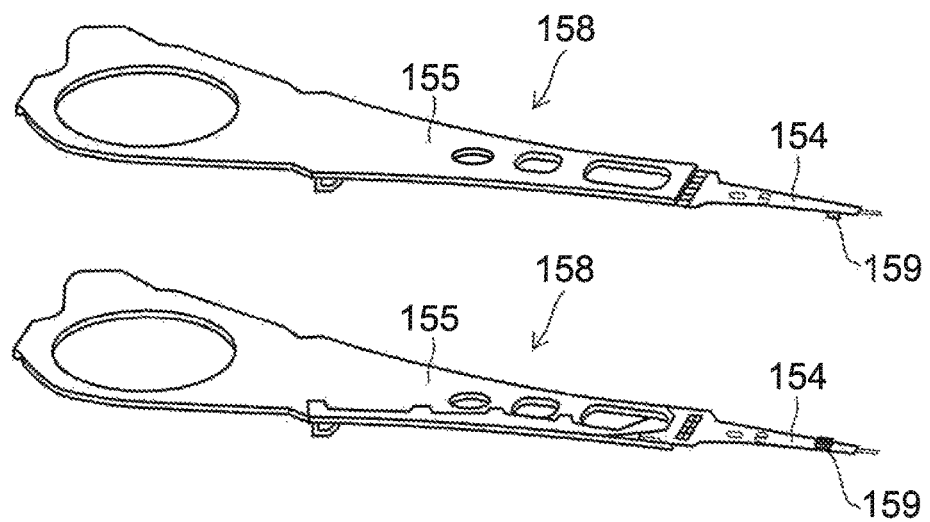

FIG. 12A and FIG. 12B are schematic perspective views illustrating a portion of the magnetic recording and reproducing device according to the embodiment.

As shown in FIG. 11, a rotary actuator is used in the magnetic recording and reproducing device 150 according to the embodiment. A recording medium disk 180 is mounted to a spindle motor 180M. The recording medium disk 180 is rotated in the direction of arrow AR by the spindle motor 180M. The spindle motor 180M responds to a control signal from a drive device controller. The magnetic recording and reproducing device 150 according to the embodiment may include multiple recording medium disks 180. The magnetic recording and reproducing device 150 may include a recording medium 181. The recording medium 181 is, for example, a SSD (Solid State Drive). The recording medium 181 includes, for example, nonvolatile memory such as flash memory, etc. For example, the magnetic recording and reproducing device 150 may be a hybrid HDD (Hard Disk Drive).

The head slider 159 records and reproduces the information recorded in the recording medium disk 180. The head slider 159 is provided at the tip of a suspension 154 having a thin-film configuration. The magnetic head according to the embodiment is provided at the tip vicinity of the head slider 159.

When the recording medium disk 180 rotates, the downward pressure due to the suspension 154 and the pressure generated by the medium-opposing surface (the ABS) of the head slider 159 are balanced. The distance between the medium-opposing surface of the head slider 159 and the surface of the recording medium disk 180 becomes a prescribed fly height. In the embodiment, the head slider 159 may contact the recording medium disk 180. For example, contact-sliding is applicable.

The suspension 154 is connected to one end of an arm 155 (e.g., an actuator arm). The arm 155 includes, for example, a bobbin part, etc. The bobbin part holds a drive coil. A voice coil motor 156 is provided at the other end of the arm 155. The voice coil motor 156 is one type of linear motor. The voice coil motor 156 includes, for example, the drive coil and a magnetic circuit. The drive coil is, wound onto the bobbin part of the arm 155. The magnetic circuit includes a permanent magnet and an opposing yoke. The drive coil is provided between the permanent magnet and the opposing yoke. The suspension 154 has one end and another end. The magnetic head is provided at the one end of the suspension 154. The arm 155 is connected to the other end of the suspension 154.

The arm 155 is held by ball bearings. The ball bearings are provided at two locations above and below a bearing part 157. The arm 155 can rotate and slide due to the voice coil motor 156. The magnetic head is movable to any position of the recording medium disk 180.

FIG. 12A illustrates the configuration of a portion of the magnetic recording and reproducing device and is an enlarged perspective view of a head stack assembly 160.

FIG. 12B is a perspective view illustrating a magnetic head assembly (a head gimbal assembly (HGA)) 158 that is a portion of the head stack assembly 160.

As shown in FIG. 12A, the head stack assembly 160 includes the bearing part 157, the head gimbal assembly 158, and a support frame 161. The head gimbal assembly 158 extends from the bearing part 157. The support frame 161 extends from the bearing part 157. The direction in which the support frame 161 extends is the reverse of the direction in which the head gimbal assembly 158 extends. The support frame 161 supports a coil 162 of the voice coil motor 156.

As shown in FIG. 12B, the head gimbal assembly 158 includes the arm 155 extending from the bearing part 157, and the suspension 154 extending from the arm 155.

The head slider 159 is provided at the tip of the suspension 154. The magnetic head according to the embodiment is provided at the head slider 159.

The magnetic head assembly (the head gimbal assembly) 158 according to the embodiment includes the magnetic head according to the embodiment, the head slider 159 on which the magnetic head is provided, the suspension 154, and the arm 155. The head slider 159 is provided at one end of the suspension 154. The arm 155 is connected to the other end of the suspension 154.

The suspension 154 includes, for example, lead wires (not illustrated) that are for recording and reproducing signals. The suspension 154 may include, for example, lead wires (not illustrated) for a heater that adjusts the fly height. The suspension 154 may include, for example, lead wires (not illustrated) for a spin torque oscillator, etc. These lead wires are electrically connected to multiple electrodes provided in the magnetic head.

The signal processor 190 is provided in the magnetic recording and reproducing device 150. The signal processor 190 records and reproduces the signals to and from the magnetic recording medium by using the magnetic head. In the signal processor 190, for example, the input/output lines of the signal processor 190 are electrically connected to the magnetic head by being connected to electrode pads of the head gimbal assembly 158.

The magnetic recording and reproducing device 150 according to the embodiment includes a magnetic recording medium, the magnetic head according to the embodiment, a movable part, a position controller, and a signal processor. The movable part causes the magnetic recording medium and the magnetic head to separate or causes the magnetic recording medium and the magnetic head to be movable relative to each other in a state of contact. The position controller aligns the magnetic head at a prescribed recording position of the magnetic recording medium. The signal processor records and reproduces the signals to and from the magnetic recording medium by using the magnetic head.

For example, the recording medium disk 180 is used as the magnetic recording medium recited above. The movable part recited above includes, for example, the head slider 159. The position controller recited above includes, for example, the head gimbal assembly 158.

The magnetic recording and reproducing device 150 according to the embodiment includes a magnetic recording medium, the magnetic head assembly according to the embodiment, and a signal processor that records and reproduces the signals to and from the magnetic recording medium by using a magnetic head provided in the magnetic head assembly.

The embodiments include the following configurations (e.g., technological proposals).

Configuration 1

A magnetic recording and reproducing device, comprising:

an output driver outputting a recording signal corresponding to input information;

a magnetic head including a coil, a recording current flowing in the coil, the recording current including the recording signal; and a magnetic recording medium, information being recorded in the magnetic recording medium by the magnetic head, the information corresponding to the input information, the input information including a first information combination, a second information combination, and a third information combination, the first information combination including first to fourth information, the second information being after the first information and being continuous with the first information, the third information being after the second information and being continuous with the second information, the fourth information being after the third information and being continuous with the third information, the first information being 0 in a NRZI code, the second information being 0 in the NRZI code, the third information being 1 in the NRZI code, the fourth information being 1 in the NRZI code, the second information combination including fifth to eighth information, the sixth information being after the fifth information and being continuous with the fifth information, the seventh information being after the sixth information and being continuous with the sixth information, the eighth information being after the seventh information and being continuous with the seventh information, the fifth information being 0 in the NRZI code, the sixth information being 0 in the NRZI code, the seventh information being 1 in the NRZI code, the eighth information being 0 in the NRZI code, the third information combination including ninth to twelfth information, the tenth information being after the ninth information and being continuous with the ninth information, the eleventh information being after the tenth information and being continuous with the tenth information, the twelfth information being after the eleventh information and being continuous with the eleventh information, the ninth information being 1 or 0 in the NRZI code, the tenth information being 1 in the NRZI code, the eleventh information being 1 in the NRZI code, the twelfth information being 1 or 0 in the NRZI code, the recording signal changing to an eleventh recording current to correspond to the eleventh information, the recording signal changing to a third recording current to correspond to the third information, an absolute value of the eleventh recording current being greater than an absolute value of the third recording current.

Configuration 2

The magnetic recording and reproducing device according to Configuration 1, wherein the recording signal changes to a seventh recording current to correspond to the seventh information, and the absolute value of the eleventh recording current is greater than an absolute value of the seventh recording current.

Configuration 3

The magnetic recording and reproducing device according to Configuration 1 or 2, wherein the input information further includes a fourth information combination, the fourth information combination includes thirteenth to sixteenth information, the fourteenth information is after the thirteenth information and is continuous with the thirteenth information, the fifteenth information is after the fourteenth information and is continuous with the fourteenth information, the sixteenth information is after the fifteenth information and is continuous with the fifteenth information, the thirteenth information is 1 in the NRZI code, the fourteenth information is 0 in the NRZI code, the fifteenth information is 1 in the NRZI code, the sixteenth information is 1 or 0 in the NRZI code, the recording signal changes to a fifteenth recording current to correspond to the fifteenth information, the absolute value of the eleventh recording current is greater than an absolute value of the fifteenth recording current.

Configuration 4

The magnetic recording and reproducing device according to Configuration 3, wherein a ratio of a difference between the absolute value of the eleventh recording current and the absolute value of the third recording current to the absolute value of the third recording current is 0.05 or more.

Configuration 5

A magnetic recording and reproducing device, comprising:

an output driver outputting a recording signal corresponding to input information;

a magnetic head including a coil, a recording current flowing in the coil, the recording current including the recording signal; and a magnetic recording medium, information being recorded in the magnetic recording medium by the magnetic head, the information corresponding to the input information, the input information including a first information combination and a second information combination, the first information combination including first to fourth information, the second information being after the first information and being continuous with the first information, the third information being after the second information and being continuous with the second information, the fourth information being after the third information and being continuous with the third information, the first information being 0 in a NRZI code, the second information being 0 in the NRZI code, the third information being 1 in the NRZI code, the fourth information being 1 in the NRZI code, the second information combination including fifth to eighth information, the sixth information being after the fifth information and being continuous with the fifth information, the seventh information being after the sixth information and being continuous with the sixth information, the eighth information being after the seventh information and being continuous with the seventh information, the fifth information being 0 in the NRZI code, the sixth information being 0 in the NRZI code, the seventh information being 1 in the NRZI code, the eighth information being 0 in the NRZI code, a polarity of the recording signal changing from a first polarity to a second polarity to correspond to the third information, the second polarity being the reverse of the first polarity, the polarity of the recording signal changing from a third polarity to a fourth polarity to correspond to the seventh information, the fourth polarity being the reverse of the third polarity, a difference between a time of the third information and a time of the change from the first polarity to the second polarity being different from a difference between a time of the seventh information and a time of the change from the third polarity to the fourth polarity.

Configuration 6

The magnetic recording and reproducing device according to Configuration 5, wherein the time of the change from the third polarity to the fourth polarity is after the time of the seventh information.

Configuration 7

The magnetic recording and reproducing device according to Configuration 5 or 6, wherein an absolute value of the difference between the time of the seventh information and the time of the change from the third polarity to the fourth polarity is greater than an absolute value of the difference between the time of the third information and the time of the change from the first polarity to the second polarity.

Configuration 8

The magnetic recording and reproducing device according to Configuration 5 or 6, wherein an absolute value of the difference between the time of the seventh information and the time of the change from the third polarity to the fourth polarity is not less than 7% and not more than 20% of an interval between the time of the seventh information and a time of the eighth information.

Configuration 9

The magnetic recording and reproducing device according to Configuration 5 or 6, wherein an absolute value of the difference between the time of the seventh information and the time of the change from the third polarity to the fourth polarity is not less than 10% and not more than 15% of an interval between the time of the seventh information and a time of the eighth information.

Configuration 10

The magnetic recording and reproducing device according to any one of Configurations 1 to 5, wherein an absolute value of the difference between the time of the third information and the time of the change from the first polarity to the second polarity is less than 7% of an interval between the time of the third information and the time of the fourth information.

Configuration 11

The magnetic recording and reproducing device according to any one of Configurations 5 to 9, wherein an absolute value of the difference between the time of the third information and the time of the change from the first polarity to the second polarity is not more than 2% of an interval between the time of the third information and the time of the fourth information.

Configuration 12

The magnetic recording and reproducing device according to Configuration 5 or 6, wherein a difference between a ratio of an absolute value of the difference between the time of the seventh information and the time of the change from the third polarity to the fourth polarity to an interval between the time of the seventh information and a time of the eighth information and a ratio of an absolute value of the difference between the time of the third information and the time of the change from the first polarity to the second polarity to an interval between the time of the third information and the time of the fourth information is greater than 0.02.

Configuration 13

The magnetic recording and reproducing device according to Configuration 5 or 6, wherein a difference between a ratio of an absolute value of the difference between the time of the seventh information and the time of the change from the third polarity to the fourth polarity to an interval between the time of the seventh information and a time of the eighth information and a ratio of an absolute value of the difference between the time of the third information and the time of the change from the first polarity to the second polarity to an interval between the time of the third information and the time of the fourth information is 0.05 or more.

Configuration 14

The magnetic recording and reproducing device according to any one of Configurations 5 to 13, wherein
the input information further includes a third information combination,
the third information combination includes ninth to twelfth information,
the tenth information is after the ninth information and is continuous with the ninth information,
the eleventh information is after the tenth information and is continuous with the tenth information,
the twelfth information is after the eleventh information and is continuous with the eleventh information,
the ninth information is 1 or 0 in the NRZI code,
the tenth information is 1 in the NRZI code,
the eleventh information is 1 in the NRZI code,
the twelfth information is 1 or 0 in the NRZI code,
the recording signal changes to an eleventh recording current to correspond to the eleventh information,
the recording signal changes to a third recording current to correspond to the third information,
an absolute value of the eleventh recording current is greater than an absolute value of the third recording current.

Configuration 15

The magnetic recording and reproducing device according to Configuration 14, wherein
the recording signal changes to a seventh recording current to correspond to the seventh information, and
the absolute value of the eleventh recording current is greater than an absolute value of the seventh recording current.

Configuration 16

The magnetic recording and reproducing device according to Configuration 14 or 15, wherein
the input information further includes a fourth information combination,
the fourth information combination includes thirteenth to sixteenth information,
the fourteenth information is after the thirteenth information and is continuous with the thirteenth information,
the fifteenth information is after the fourteenth information and is continuous with the fourteenth information,
the sixteenth information is after the fifteenth information and is continuous with the fifteenth information,
the thirteenth information is 1 in the NRZI code,
the fourteenth information is 0 in the NRZI code,
the fifteenth information is 1 in the NRZI code,
the sixteenth information is 1 or 0 in the NRZI code,
the recording signal changes to a fifteenth recording current to correspond to the fifteenth information, and
the absolute value of the eleventh recording current is greater than an absolute value of the fifteenth recording current.

Configuration 17

The magnetic recording and reproducing device according to Configuration 16, wherein a ratio of a difference between the absolute value of the eleventh recording current and the absolute value of the third recording current to the absolute value of the third recording current is 0.05 or less.

Configuration 18

A magnetic recording and reproducing device, comprising:
an output driver outputting a recording signal corresponding to input information;
a magnetic head including a coil receiving the recording signal; and
a magnetic recording medium, information being recorded in the magnetic recording medium by the magnetic head, the information corresponding to the input information,
the input information including a first information combination, a second information combination, and a third information combination,
the first information combination including first to fourth information,
the second information being after the first information and being continuous with the first information,
the third information being after the second information and being continuous with the second information,
the fourth information being after the third information and being continuous with the third information,
the first information being 0 in a NRZI code,
the second information being 0 in the NRZI code,
the third information being 1 in the NRZI code,
the fourth information being 1 in the NRZI code,
the second information combination including fifth to eighth information,
the sixth information being after the fifth information and being continuous with the fifth information,
the seventh information being after the sixth information and being continuous with the sixth information,
the eighth information being after the seventh information and being continuous with the seventh information,
the fifth information being 0 in the NRZI code,
the sixth information being 0 in the NRZI code,
the seventh information being 1 in the NRZI code,
the eighth information being 0 in the NRZI code,
the third information combination including ninth to twelfth information,
the tenth information being after the ninth information and being continuous with the ninth information,
the eleventh information being after the tenth information and being continuous with the tenth information,
the twelfth information being after the eleventh information and being continuous with the eleventh information,
the ninth information being 1 or 0 in the NRZI code,
the tenth information being 1 in the NRZI code,
the eleventh information being 1 in the NRZI code,
the twelfth information being 1 or 0 in the NRZI code,
the recording signal changes to a third recording current to correspond to the third information,
the recording signal changing to a seventh recording current to correspond to the seventh information,
the absolute value of the eleventh recording current being greater than an absolute value of the third recording current and greater than an absolute value of the seventh recording current.

Configuration 19

A magnetic recording and reproducing device, comprising:
  an output driver outputting a recording signal corresponding to input information;
  a magnetic head including a coil, a recording current flowing in the coil, the recording current including the recording signal; and
  a magnetic recording medium, information being recorded in the magnetic recording medium by the magnetic head, the information corresponding to the input information,
  the input information including "011X" in a NRZI code and "111X" in the NRZI code,
  an absolute value of the third recording current from the front of the "011X" and an absolute value of the third recording current from the front of the "111X" being greater than an absolute value of the second recording current from the front of the "011X",
  the "011X" being "0110" or "0111" in the NRZI code,
  the "111X" being "1110" or "1111" in the NRZI code.

According to the embodiments, a magnetic recording and reproducing device can be provided in which the recording density can be increased.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic recording and reproducing devices such as magnetic heads, coils, magnetic poles, magnetic recording mediums, output derivers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic recording and reproducing devices practicable by an appropriate design modification by one skilled in the art based on the magnetic recording and reproducing devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic recording and reproducing device, comprising:
  an output driver outputting a recording signal corresponding to input information;
  a magnetic head including a coil, a recording current flowing in the coil, the recording current including the recording signal; and
  a magnetic recording medium, information being recorded in the magnetic recording medium by the magnetic head, the information corresponding to the input information,
  the input information including a first information combination, a second information combination, and a third information combination,
  the first information combination including first to fourth information,
  the second information being after the first information and being continuous with the first information,
  the third information being after the second information and being continuous with the second information,
  the fourth information being after the third information and being continuous with the third information,
  the first information being 0 in a NRZI code,
  the second information being 0 in the NRZI code,
  the third information being 1 in the NRZI code,
  the fourth information being 1 in the NRZI code,
  the second information combination including fifth to eighth information,
  the sixth information being after the fifth information and being continuous with the fifth information,
  the seventh information being after the sixth information and being continuous with the sixth information,
  the eighth information being after the seventh information and being continuous with the seventh information,
  the fifth information being 0 in the NRZI code,
  the sixth information being 0 in the NRZI code,
  the seventh information being 1 in the NRZI code,
  the eighth information being 0 in the NRZI code,
  the third information combination including ninth to twelfth information,
  the tenth information being after the ninth information and being continuous with the ninth information,
  the eleventh information being after the tenth information and being continuous with the tenth information,
  the twelfth information being after the eleventh information and being continuous with the eleventh information,
  the ninth information being 1 or 0 in the NRZI code,
  the tenth information being 1 in the NRZI code,
  the eleventh information being 1 in the NRZI code,
  the twelfth information being 1 or 0 in the NRZI code,
  the recording signal changing to an eleventh recording current to correspond to the eleventh information,
  the recording signal changing to a third recording current to correspond to the third information,
  an absolute value of the eleventh recording current being greater than an absolute value of the third recording current.

2. The device according to claim 1, wherein
  the recording signal changes to a seventh recording current to correspond to the seventh information, and
  the absolute value of the eleventh recording current is greater than an absolute value of the seventh recording current.

3. The device according to claim 1, wherein
the input information further includes a fourth information combination,
the fourth information combination includes thirteenth to sixteenth information,
the fourteenth information is after the thirteenth information and is continuous with the thirteenth information,
the fifteenth information is after the fourteenth information and is continuous with the fourteenth information,
the sixteenth information is after the fifteenth information and is continuous with the fifteenth information,
the thirteenth information is 1 in the NRZI code,
the fourteenth information is 0 in the NRZI code,
the fifteenth information is 1 in the NRZI code,
the sixteenth information is 1 or 0 in the NRZI code,
the recording signal changes to a fifteenth recording current to correspond to the fifteenth information, and
the absolute value of the eleventh recording current is greater than an absolute value of the fifteenth recording current.

4. The device according to claim 3, wherein a ratio of a difference between the absolute value of the eleventh recording current and the absolute value of the third recording current to the absolute value of the third recording current is 0.05 or more.

5. A magnetic recording and reproducing device, comprising:
an output driver outputting a recording signal corresponding to input information;
a magnetic head including a coil, a recording current flowing in the coil, the recording current including the recording signal; and
a magnetic recording medium, information being recorded in the magnetic recording medium by the magnetic head, the information corresponding to the input information,
the input information including a first information combination and a second information combination,
the first information combination including first to fourth information,
the second information being after the first information and being continuous with the first information,
the third information being after the second information and being continuous with the second information,
the fourth information being after the third information and being continuous with the third information,
the first information being 0 in a NRZI code,
the second information being 0 in the NRZI code,
the third information being 1 in the NRZI code,
the fourth information being 1 in the NRZI code,
the second information combination including fifth to eighth information,
the sixth information being after the fifth information and being continuous with the fifth information,
the seventh information being after the sixth information and being continuous with the sixth information,
the eighth information being after the seventh information and being continuous with the seventh information,
the fifth information being 0 in the NRZI code,
the sixth information being 0 in the NRZI code,
the seventh information being 1 in the NRZI code,
the eighth information being 0 in the NRZI code,
a polarity of the recording signal changing from a first polarity to a second polarity to correspond to the third information, the second polarity being the reverse of the first polarity,
the polarity of the recording signal changing from a third polarity to a fourth polarity to correspond to the seventh information, the fourth polarity being the reverse of the third polarity,
a difference between a time of the third information and a time of the change from the first polarity to the second polarity being different from a difference between a time of the seventh information and a time of the change from the third polarity to the fourth polarity.

6. The device according to claim 5, wherein the time of the change from the third polarity to the fourth polarity is after the time of the seventh information.

7. The device according to claim 5, wherein an absolute value of the difference between the time of the seventh information and the time of the change from the third polarity to the fourth polarity is greater than an absolute value of the difference between the time of the third information and the time of the change from the first polarity to the second polarity.

8. The device according to claim 5, wherein an absolute value of the difference between the time of the seventh information and the time of the change from the third polarity to the fourth polarity is not less than 7% and not more than 20% of an interval between the time of the seventh information and a time of the eighth information.

9. The device according to claim 5, wherein an absolute value of the difference between the time of the seventh information and the time of the change from the third polarity to the fourth polarity is not less than 10% and not more than 15% of an interval between the time of the seventh information and a time of the eighth information.

10. The device according to claim 5, wherein an absolute value of the difference between the time of the third information and the time of the change from the first polarity to the second polarity is less than 7% of an interval between the time of the third information and the time of the fourth information.

11. The device according to claim 5, wherein an absolute value of the difference between the time of the third information and the time of the change from the first polarity to the second polarity is not more than 2% of an interval between the time of the third information and the time of the fourth information.

12. The device according to claim 5, wherein a difference between a ratio of an absolute value of the difference between the time of the seventh information and the time of the change from the third polarity to the fourth polarity to an interval between the time of the seventh information and a time of the eighth information and a ratio of an absolute value of the difference between the time of the third information and the time of the change from the first polarity to the second polarity to an interval between the time of the third information and the time of the fourth information is greater than 0.02.

13. The device according to claim 5, wherein a difference between a ratio of an absolute value of the difference between the time of the seventh information and the time of the change from the third polarity to the fourth polarity to an interval between the time of the seventh information and a time of the eighth information and a ratio of an absolute value of the difference between the time of the third information and the time of the change from the first polarity to the second polarity to an interval between the time of the third information and the time of the fourth information is 0.05 or more.

14. The device according to claim 5, wherein
the input information further includes a third information combination,
the third information combination includes ninth to twelfth information,
the tenth information is after the ninth information and is continuous with the ninth information,
the eleventh information is after the tenth information and is continuous with the tenth information,
the twelfth information is after the eleventh information and is continuous with the eleventh information,
the ninth information is 1 or 0 in the NRZI code,
the tenth information is 1 in the NRZI code,
the eleventh information is 1 in the NRZI code,
the twelfth information is 1 or 0 in the NRZI code,
the recording signal changes to an eleventh recording current to correspond to the eleventh information,
the recording signal changes to a third recording current to correspond to the third information, and
an absolute value of the eleventh recording current is greater than an absolute value of the third recording current.

15. The device according to claim 14, wherein
the recording signal changes to a seventh recording current to correspond to the seventh information, and
the absolute value of the eleventh recording current is greater than an absolute value of the seventh recording current.

16. The device according to claim 14, wherein
the input information further includes a fourth information combination,
the fourth information combination includes thirteenth to sixteenth information,
the fourteenth information is after the thirteenth information and is continuous with the thirteenth information,
the fifteenth information is after the fourteenth information and is continuous with the fourteenth information,
the sixteenth information is after the fifteenth information and is continuous with the fifteenth information,
the thirteenth information is 1 in the NRZI code,
the fourteenth information is 0 in the NRZI code,
the fifteenth information is 1 in the NRZI code,
the sixteenth information is 1 or 0 in the NRZI code,
the recording signal changes to a fifteenth recording current to correspond to the fifteenth information, and
the absolute value of the eleventh recording current is greater than an absolute value of the fifteenth recording current.

17. The device according to claim 16, wherein a ratio of a difference between the absolute value of the eleventh recording current and the absolute value of the third recording current to the absolute value of the third recording current is 0.05 or less.

18. A magnetic recording and reproducing device, comprising:
an output driver outputting a recording signal corresponding to input information;
a magnetic head including a coil, a recording current flowing in the coil, the recording current including the recording signal; and
a magnetic recording medium, information being recorded in the magnetic recording medium by the magnetic head, the information corresponding to the input information,
the input information including "011X" in a NRZI code and "111X" in the NRZI code,
an absolute value of the third recording current from the front of the "011X" and an absolute value of the third recording current from the front of the "111X" being greater than an absolute value of the second recording current from the front of the "011X",
the "011X" being "0110" or "0111" in the NRZI code,
the "111X" being "1110" or "1111" in the NRZI code.

* * * * *